United States Patent
Yoshida et al.

(10) Patent No.: US 12,340,044 B2
(45) Date of Patent: Jun. 24, 2025

(54) TOUCH DETECTION DEVICE HAVING A PLURALITY OF INITIAL SETTING DISTANCE

(71) Applicant: Japan Display Inc., Tokyo (JP)

(72) Inventors: Koji Yoshida, Tokyo (JP); Makoto Ishikawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/409,303

(22) Filed: Jan. 10, 2024

(65) Prior Publication Data

US 2024/0241593 A1 Jul. 18, 2024

(30) Foreign Application Priority Data

Jan. 13, 2023 (JP) ................. 2023-004095

(51) Int. Cl.
   *G06F 3/041* (2006.01)
   *G06F 3/044* (2006.01)
(52) U.S. Cl.
   CPC ............ *G06F 3/0416* (2013.01); *G06F 3/044* (2013.01)
(58) Field of Classification Search
   CPC .................................................. G06F 3/0416
   USPC ....................................................... 345/174
   See application file for complete search history.

(56) References Cited

U.S. PATENT DOCUMENTS

| | | | |
|---|---|---|---|
| 2018/0039332 A1* | 2/2018 | Liang | G06F 3/04142 |
| 2020/0241675 A1 | 7/2020 | Oki et al. | |
| 2022/0404925 A1* | 12/2022 | Gray | G06F 3/04166 |
| 2023/0152914 A1 | 5/2023 | Oki et al. | |
| 2023/0221821 A1* | 7/2023 | Nakanishi | G06F 3/0418 |
| | | | 345/174 |

FOREIGN PATENT DOCUMENTS

WO 2019/082399 A1 5/2019

\* cited by examiner

*Primary Examiner* — Long D Pham
(74) *Attorney, Agent, or Firm* — K&L Gates LLP

(57) ABSTRACT

A detection device includes: a sensor region having a detection region; and a detector disposed on a back surface of a front plate that is a nonconductor. The detector is configured to detect an object to be detected on or above a surface of the front plate opposite to the sensor region and overlapping the detection region based on detection values of electrodes in the detection region. The detector includes: an initial setter configured to set a second distance not smaller than a first distance in a height direction of the front plate and register XY coordinates of an indicator in an XY plane where the object to be detected is detectable; a storage configured to store a parameter generated by the initial setter; and a gesture determination processor configured to determine a gesture corresponding to change in spatial coordinates of the object to be detected based on the parameter.

5 Claims, 18 Drawing Sheets

FIG.8A
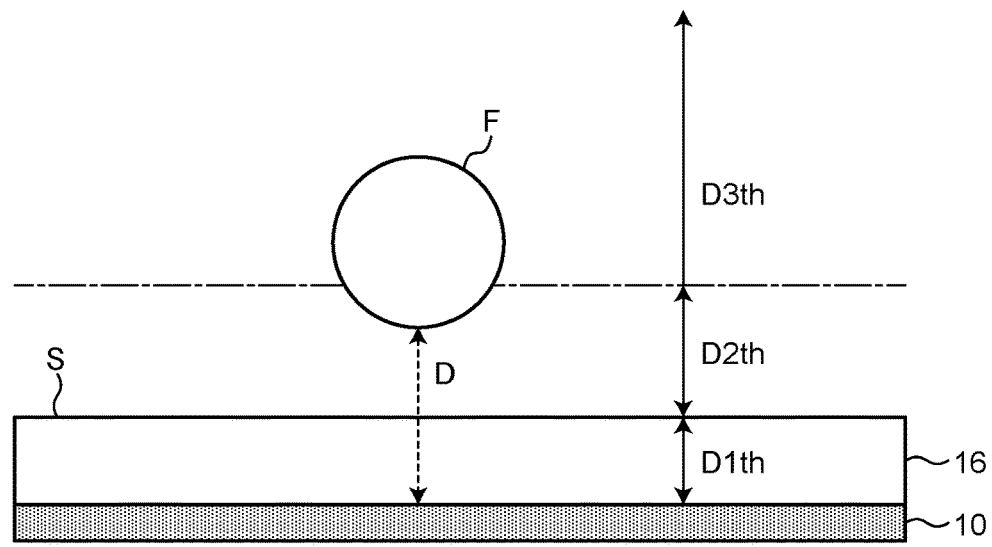
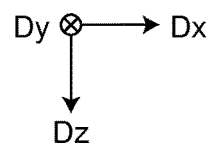
FIG.8B
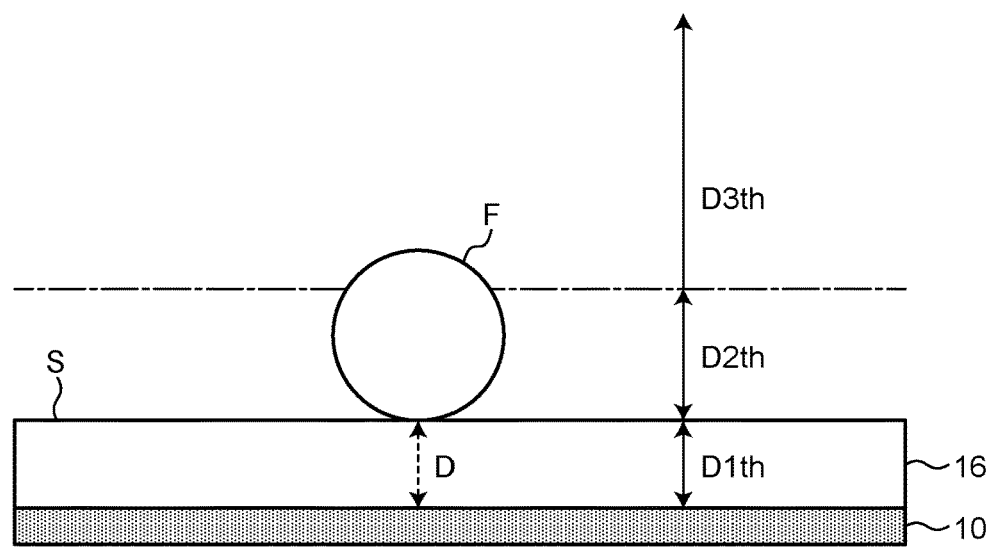
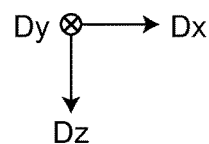

TOUCH DETECTION DEVICE HAVING A PLURALITY OF INITIAL SETTING DISTANCE

CROSS-REFERENCE TO RELATED APPLICATION

This application claims the benefit of priority from Japanese Patent Application No. 2023-004095 filed on Jan. 13, 2023, the entire contents of which are incorporated herein by reference.

BACKGROUND

1. Technical Field

What is disclosed herein relates to a detection device.

2. Description of the Related Art

In recent years, widely known are detection systems, what are called touch panels, in which a detection device capable of detecting an external proximity object is mounted on or integrated with a display device, such as a liquid crystal display device. Also known are touch panels in which a thin front plate made of natural material, such as wood, natural fiber, natural leather, and natural stone, covers the entire front surface of the touch panel to secure visibility and improve the user's operability (refer to WO 2019/082399, for example).

If the front plate described in WO 2019/082399 has a larger thickness, however, it is necessary to increase the detection sensitivity of the sensor region. Increasing the detection sensitivity of the sensor region may possibly make the touch panel more likely to erroneously detect an object to be detected.

For the foregoing reasons, there is a need for a detection device that can appropriately detect a change in spatial coordinates of an object to be detected with respect to a front plate.

SUMMARY

According to an aspect, a detection device includes a sensor region and a detector disposed on a back surface of a front plate that is a nonconductor. The sensor region has a detection region. The detector is configured to detect an object to be detected on or above a surface of the front plate opposite to the sensor region and overlapping the detection region based on a detection value of each of a plurality of electrodes provided in the detection region. The detector includes: an initial setter configured to set a second distance equal to or larger than a first distance in a height direction of the front plate and register XY coordinates of an indicator in an XY plane where the object to be detected is detectable; a storage configured to store therein a parameter generated by the initial setter; and a gesture determination processor configured to determine a gesture corresponding to a change in spatial coordinates of the object to be detected based on the parameter stored in the storage.

BRIEF DESCRIPTION OF THE DRAWINGS

FIG. 8A is a schematic of the relation between the distance between the sensor region and the object to be detected and a determining operation;

FIG. 8B is a schematic of the relation between the distance between the sensor region and the object to be detected and the determining operation;

DETAILED DESCRIPTION

Figure 1:
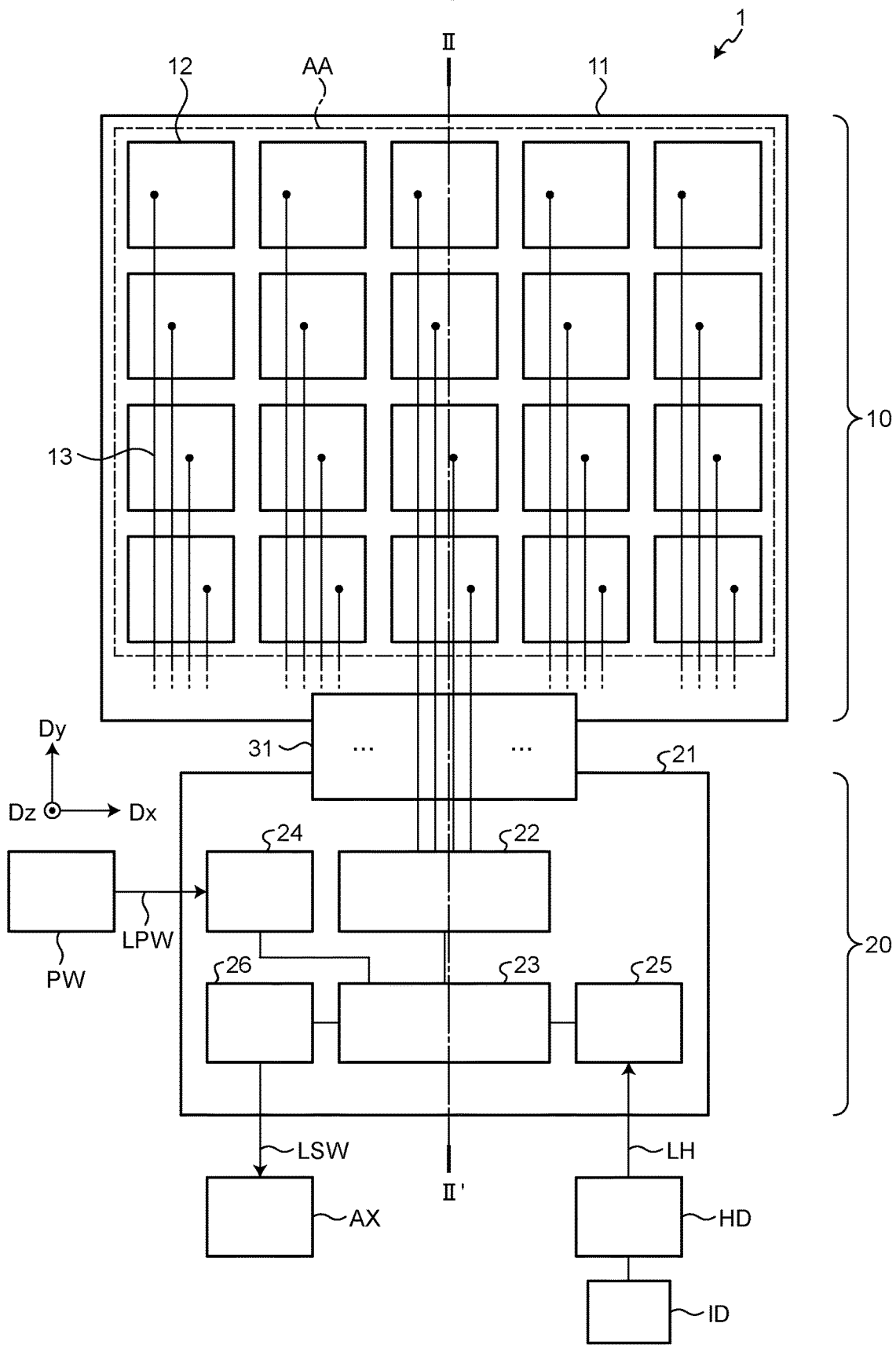
FIG. 1 is a plan view of a schematic configuration of a detection device according to a first embodiment.

Exemplary aspects (embodiments) to embody the present disclosure are described below in greater detail with reference to the accompanying drawings. The contents described in the embodiments below are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present disclosure and easily conceivable by those skilled in the art naturally fall within the scope of the present disclosure. To make the explanation more specific, the drawings may possibly illustrate the width, the thickness, the shape, and other elements of each component more schematically than the actual aspect. These elements, however, are given by way of example only and are not intended to limit interpretation of the present disclosure. In the present specification and the drawings, components similar to those previously described with reference to previous drawings are denoted by the same reference numerals, and detailed explanation thereof may be omitted as appropriate.

First Embodiment

FIG. 1 is a plan view of a schematic configuration of a detection device according to a first embodiment. As illustrated in FIG. 1, a detection device 1 includes a sensor region 10 and a detector 20.

The detector 20 is coupled to a power supply PW, an object to be controlled AX, and a host device HD.

The power supply PW is a power supply that supplies power to the detector 20.

The object to be controlled AX is an object that is controlled by the detector 20. The object to be controlled AX is lighting equipment, for example.

The host device HD is a device that inputs an initial setting value to the detector 20 by an input device ID coupled to the host device HD. The host device HD can be decoupled from the detector 20 after the initial setting is completed. The host device HD is a computer, for example. The input device ID is a keyboard, for example.

The sensor region 10 includes a sensor substrate 11, a plurality of electrodes 12 provided in a detection region AA of the sensor substrate 11, and wiring lines 13 extending from the electrodes 12. The detector 20 includes a control substrate 21, a detection circuit 22, a processing circuit 23, a power supply circuit 24, an interface circuit 25, and an output circuit 26.

The detection region AA of the sensor substrate 11 is a region provided with the plurality of electrodes 12 arrayed in a matrix (row-column configuration) in a Dx direction (first direction) and a Dy direction (second direction). The sensor substrate 11 is a glass substrate or light-transmitting flexible printed circuits (FPC), for example.

In the present disclosure, the Dx direction (first direction) and the Dy direction (second direction) are orthogonal in the detection region AA of the sensor substrate 11. In the present disclosure, the direction orthogonal to the Dx direction (first direction) and the Dy direction (second direction) is a Dz direction (third direction).

While FIG. 1 illustrates an example where 5×4 (=20) electrodes 12 with five electrodes 12 in the Dx direction and four electrodes 12 in the Dy direction are provided, the number of electrodes 12 provided to the detection region AA of the sensor substrate 11 is not limited thereto.

The sensor substrate 11 is electrically coupled to the control substrate 21 via a wiring substrate 31. The wiring substrate 31 is flexible printed circuits, for example. Each electrode 12 of the sensor region 10 is coupled to the detection circuit 22 of the detector 20 via the wiring substrate 31.

The control substrate 21 is provided with the detection circuit 22, the processing circuit 23, the power supply circuit 24, the interface circuit 25, and the output circuit 26. The control substrate 21 is a rigid substrate, for example.

The detection circuit 22 generates a detection value of each electrode 12 based on detection signals of the electrode 12 output from the sensor substrate 11. The detection circuit 22 is an analog front-end IC, for example.

The processing circuit 23 generates the spatial coordinates indicating the position where an object to be detected (e.g., operator's finger) is present on or above the detection region AA based on the detection values of the electrodes 12 output from the detection circuit 22. The processing circuit 23 may be a programmable logic device (PLD), such as a field programmable gate array (FPGA), or a micro control unit (MCU), for example.

The power supply circuit 24 is a circuit that supplies the power supply PW to the detection circuit 22 and the processing circuit 23.

The interface circuit 25 is a USB controller IC, for example, and is a circuit that controls communications between the processing circuit 23 and the input device ID of the host device HD on which the detection device is mounted.

The output circuit 26 is a circuit that drives the object to be controlled AX.

Figure 2:
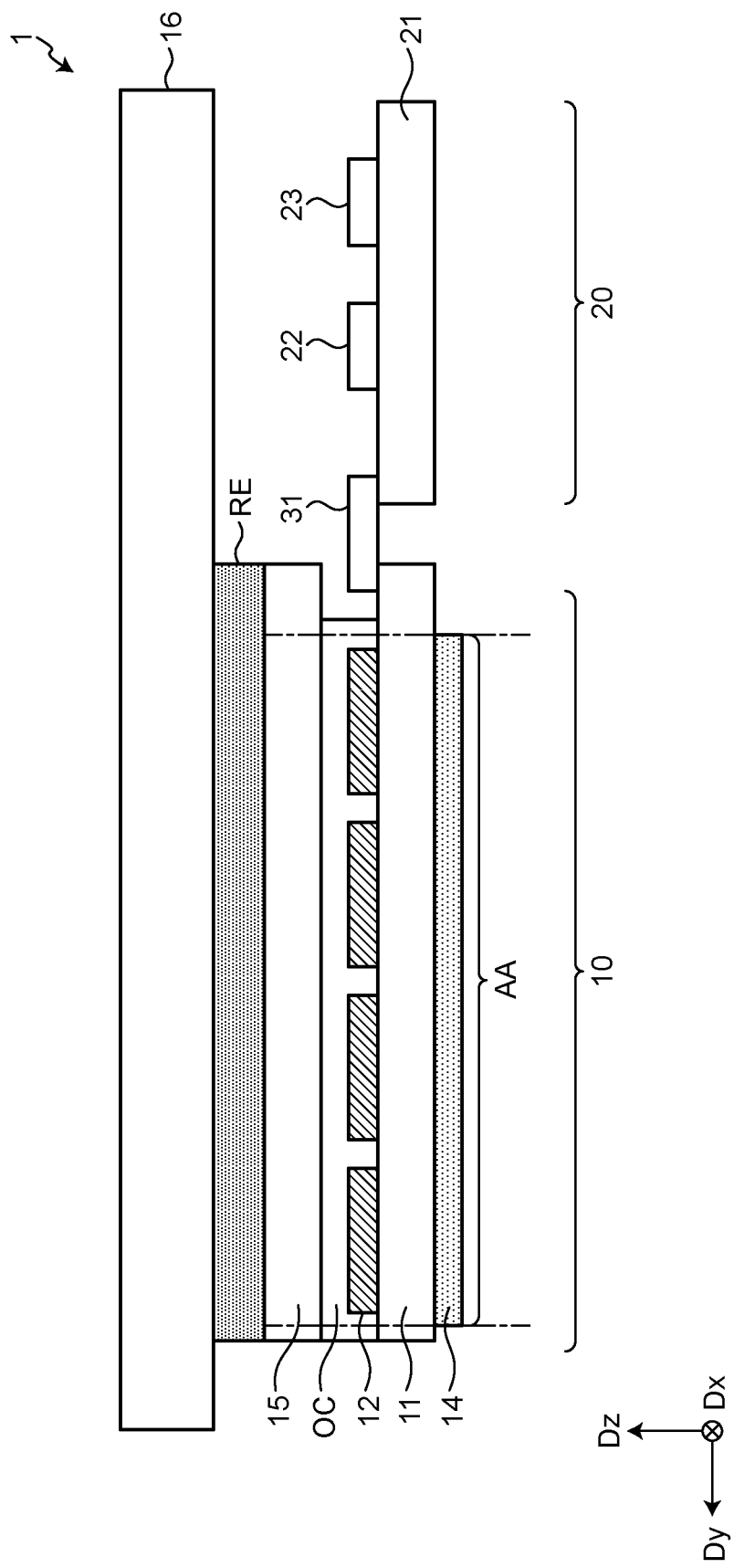
FIG. 2 is a schematic of a sectional configuration along line II-II' of FIG. 1.

FIG. 2 is a schematic of a sectional configuration along line II-II' of FIG. 1.

The sensor region 10 includes the sensor substrate 11, the electrodes 12, a shield electrode 14, and a cover glass 15. In the sensor region 10, the sensor substrate 11, the electrodes 12, and the cover glass 15 are stacked on the shield electrode 14 in the order as listed.

The cover glass 15 is disposed on the back surface of a front plate 16 including a nonconductor with a resin layer RE, which adheres the cover glass 15 to the front plate 16, interposed therebetween. The resin layer RE has such a thickness that does not affect the detection sensitivity and is 50 μm to 500 μm in thickness, for example. The space between the cover glass 15 and the front plate 16 may be filled with an air layer.

The front plate 16 is a plate made of natural material, such as wood, plywood, natural fiber, natural stone, marble, artificial stone, synthetic fiber, and synthetic leather.

The shield electrode 14 is provided to a first surface on the back side of the sensor substrate 11. The electrodes 12 are provided to a second surface opposite to the first surface of the sensor substrate 11. The cover glass 15 is provided to the second surface of the sensor substrate 11 with an adhesive layer OC interposed therebetween. The adhesive layer OC is preferably a light-transmitting adhesive. The adhesive layer OC may be formed by a light-transmitting double-sided adhesive film, such as an optical clear adhesive (OCA).

Figure 3:
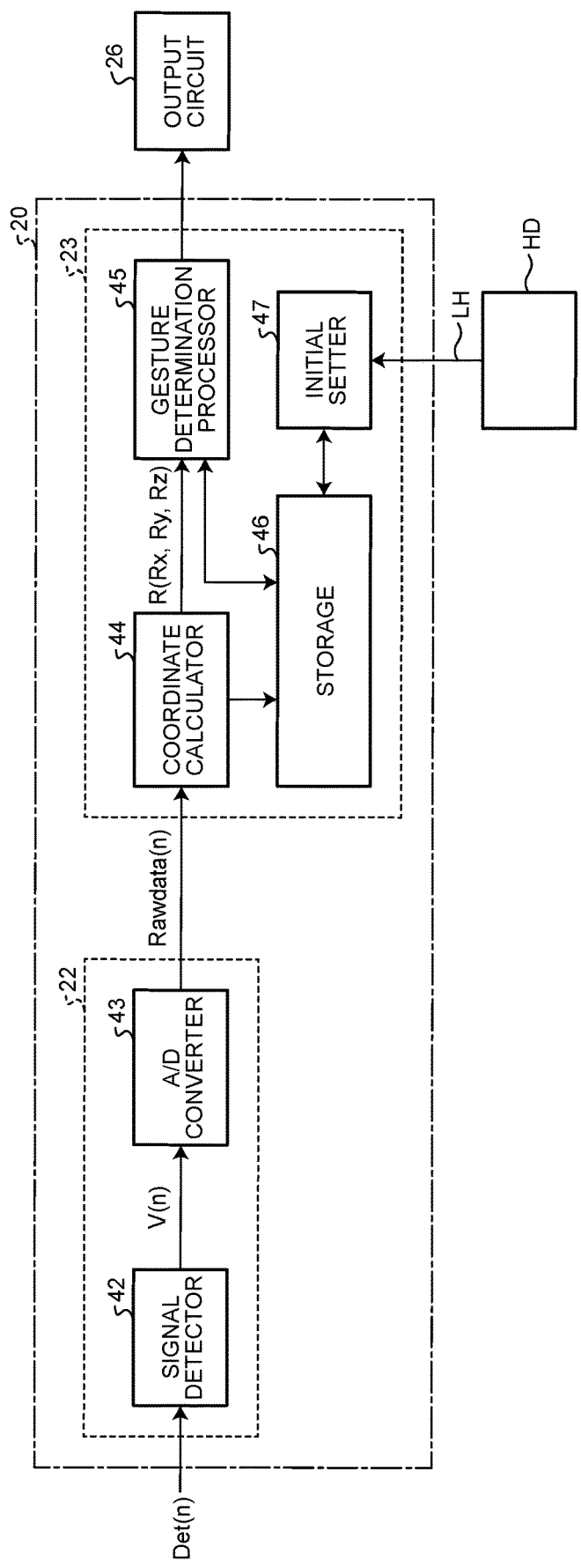
FIG. 3 is a block diagram of an exemplary configuration of a detection circuit of the detection device according to the first embodiment.

FIG. 3 is a block diagram of an exemplary configuration of the detector of the detection device according to the embodiment. The detector 20 according to the present disclosure detects operations (gestures) corresponding to the movement of the object to be detected in the space on the detection region AA.

As illustrated in FIG. 3, the detector 20 includes a signal detector 42, an analog-to-digital (A/D) converter 43, a coordinate calculator 44, a gesture determination processor 45, a storage 46, and an initial setter 47. The signal detector 42 and the A/D converter 43 are included in the detection circuit 22. The coordinate calculator 44, the gesture determination processor 45, the storage 46, and the initial setter 47 are included in the processing circuit 23.

The signal detector 42 generates an output value V(n) of each electrode 12 based on a detection signal Det(n) of the electrode 12 output from the sensor substrate 11 (n is a natural number from 1 to N, where N is the number of electrodes in the detection region AA). The A/D converter 43 samples an output value Rawdata(n) of each electrode 12 and converts it into a digital signal.

The coordinate calculator 44 calculates spatial coordinates R (Rx, Ry, Rz) of the position where the object to be detected is present, based on the output values Rawdata(n) of the electrodes 12.

The gesture determination processor 45 determines a gesture corresponding to a change in the spatial coordinates R (Rx, Ry, Rz) calculated by the coordinate calculator 44.

The storage 46 stores therein various parameters used in the processing by the gesture determination processor 45. The storage 46 also stores therein various parameters generated in the processing by the gesture determination processor 45. The storage 46 has a function of storing therein the spatial coordinates calculated by the coordinate calculator 44.

Figure 8C:
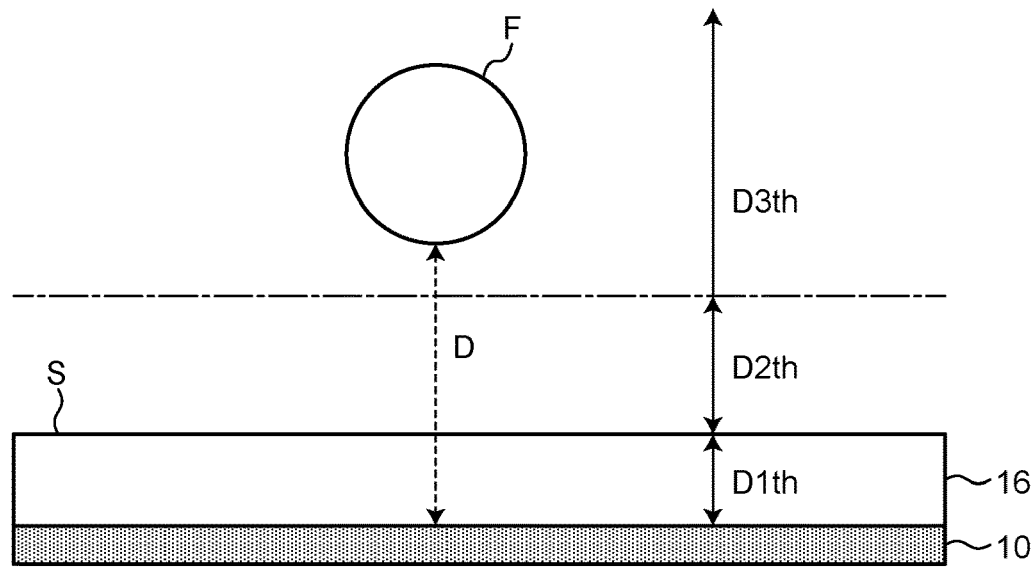
FIG. 8C is a schematic of the relation between the distance between the sensor region and the object to be detected and the determining operation.

The initial setter 47 determines the detection surface based on the thickness (first distance D1th) of the front plate 16 input by a user (refer to FIGS. 8A, 8B, and 8C). The initial setter 47 initially sets the magnitude of a second distance D2th with respect to a detection surface S input by the user. The initial setter 47 adjusts the amplification factor of an electric field of each electrode 12 in accordance with the numerical value of the material (e.g., permittivity) of the front plate 16 and performs initial setting such that an object to be detected F can be detected. The storage 46 stores therein various parameters generated in the processing by the initial setter 47. The initial setter 47 controls communications with the host device HD. The initial setter 47 receives information on the initial setting values (the first distance D1th, the material of the front plate 16, and the second distance D2th) from the host device HD.

The height of the first distance D1th is 0.5 mm to 100 mm, for example. In the detection device 1 according to the present embodiment, the detection surface S can be set even if the front plate 16 has a first distance D1th exceeding 100 mm.

The height of the second distance D2th is the height at which the detection sensitivity is effective in detecting the object to be detected F. The height of the second distance D2th is equivalent to the thickness of the front plate 16, for example. This configuration causes the effective sensitivity height to fall within an appropriate range and can prevent malfunction of the object to be controlled AX due to erroneous detection.

Figure 4A:
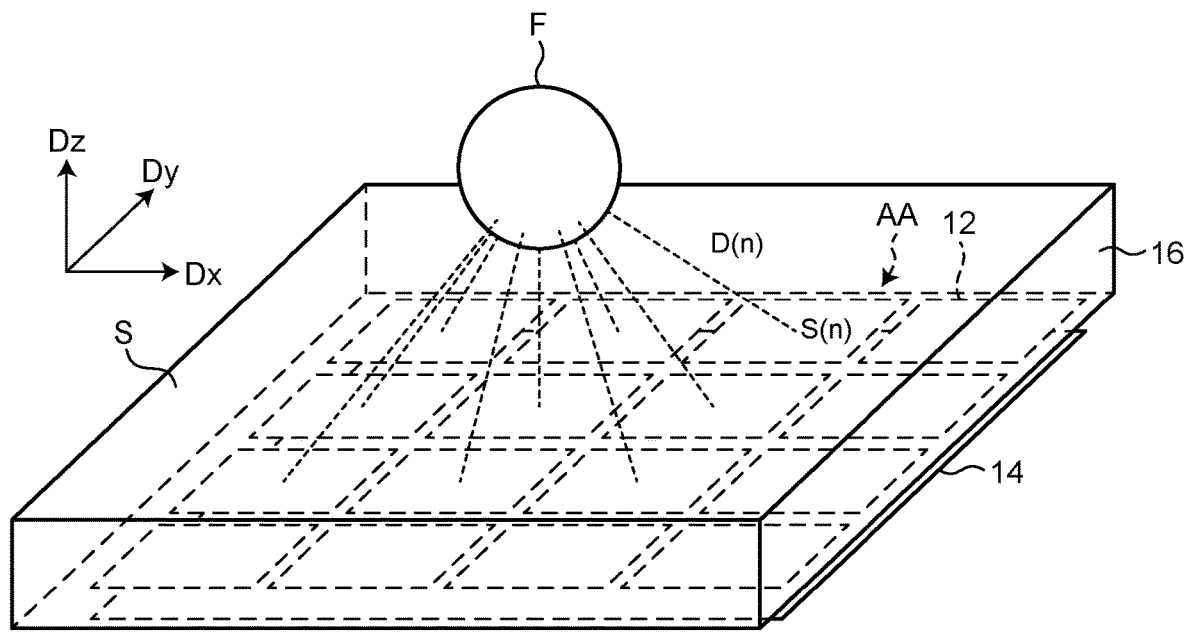
FIG. 4A is a schematic of the relation between the position of an object to be detected in a space on a detection surface and the positions of respective electrodes.
Figure 4B:
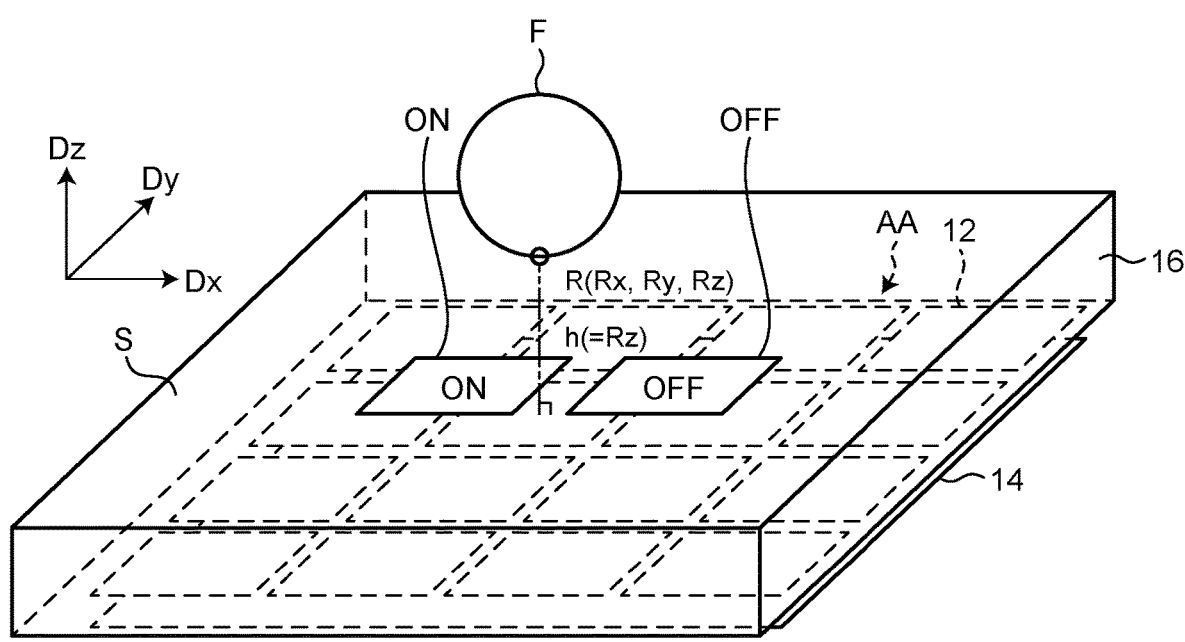
FIG. 4B is a schematic of the spatial coordinates of the object to be detected in the space on the detection surface.

FIG. 4A is a schematic of the relation between the position of the object to be detected in the space on the detection surface and the positions of the respective electrodes. FIG. 4B is a schematic of the spatial coordinates of the object to be detected on or above the detection surface.

In the present disclosure, the surface of the front plate 16 serves as the detection surface S, and the spatial coordinates R (Rx, Ry, Rz) indicate the position of the object to be detected F present on or above the detection surface S. FIGS. 4A and 4B illustrate an example where the object to be detected F is present on or above the detection surface S.

As illustrated in FIG. 4A, each electrode 12 in the detection region AA generates capacitance corresponding to a distance D(n) between the object to be detected F present on or above the detection surface S and the electrode 12, and a signal value S(n) corresponding to the capacitance is obtained.

The processing circuit 23 extracts the spatial coordinates R (Rx, Ry, Rz) indicating the position of the object to be detected F on or above the detection region AA illustrated in FIG. 4B using the generated signal values S(n) of the electrodes 12.

In the present disclosure, the spatial coordinates R (Rx, Ry, Rz) include first data Rx indicating the position in the Dx direction (first direction) on or above the detection region AA, second data Ry indicating the position in the Dy direction (second direction) on or above the detection region AA, and third data Rz indicating the position in the Dz direction (third direction) orthogonal to the Dx direction (first direction) and the Dy direction (second direction).

The processing circuit 23 transmits the results of processing by the gesture determination processor 45, that is, a command indicating a gesture determined by the movement of the object to be detected F on or above the detection region AA to the output circuit 26 via the interface circuit 25, which is a USB controller IC, for example.

The output circuit 26 performs control corresponding to the command transmitted from the processing circuit 23, that is, the results of processing by the gesture determination processor 45. Specifically, the output circuit 26 performs processing by selecting a first indicator ON or a second indicator OFF on the surface of the front plate 16 based on a determining operation command transmitted by a gesture determination process (refer to FIG. 10), which will be described later. The processing by the output circuit 26 may include dragging a selected indicator Obj and/or moving the dragged indicator Obj according to transition of the spatial coordinates R (Rx, Ry, Rz), for example. The present disclosure is not limited by the processing by the output circuit 26.

As illustrated in FIG. 4B, the first indicator ON and the second indicator OFF for detecting the object to be detected F are adhered onto the surface of the front plate 16 opposite to the detection region AA. The first indicator ON and the second indicator OFF may be drawn directly on the surface of the front plate 16 opposite to the detection region AA.

The first indicator ON is a mark to which the object to be detected F is brought closer to drive the object to be controlled AX.

The second indicator OFF is a mark to which the object to be detected F is brought closer to stop driving the object to be controlled AX.

As described above, the detection device 1 according to the present disclosure is configured to detect the spatial coordinates of the position where the object to be detected F is present on or above the detection region AA by detecting the capacitance generated at the electrodes 12. Therefore, it is necessary to increase the sensitivity of each electrode 12 by increasing their size compared to the configuration that detects the planar coordinates of the contact position of the object to be detected F with the detection surface. In the present disclosure, the size of each electrode 12 is assumed to be approximately $20 \times 20$ mm$^2$ to $50 \times 50$ mm$^2$, for example. In other words, the distance between the electrodes 12 in the Dx direction and the Dy direction is assumed to be approximately 20 mm to 50 mm, for example.

Figure 5:
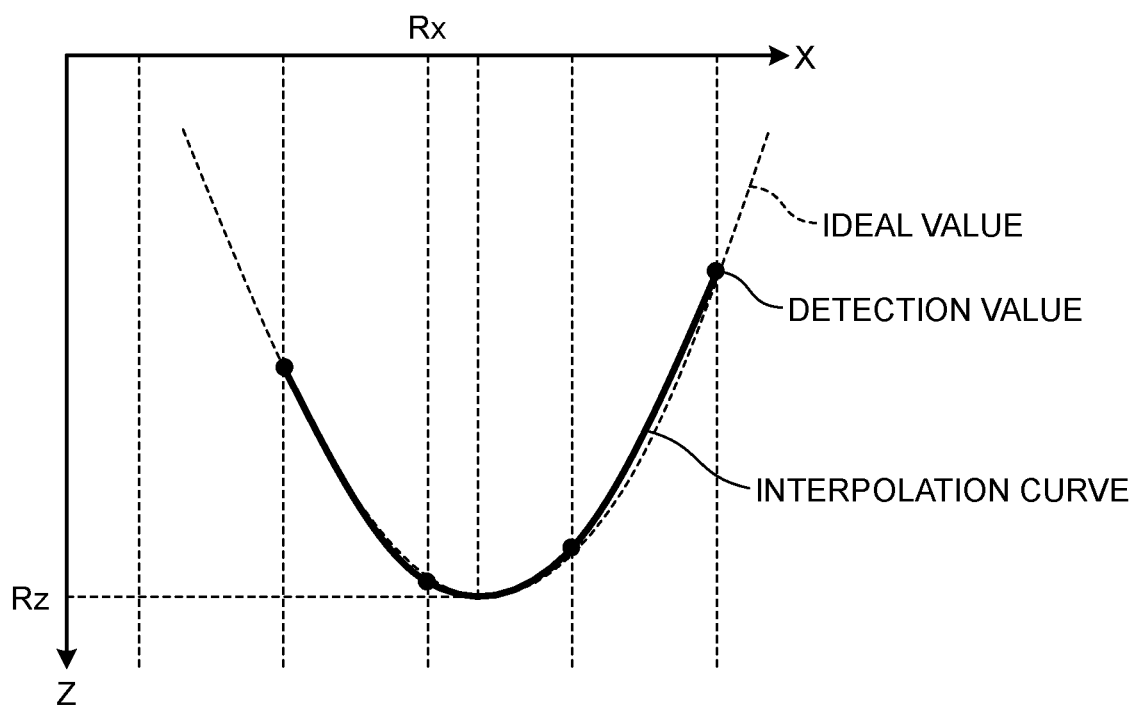
FIG. 5 is a conceptual graph illustrating an example of a method for calculating the spatial coordinates of the object to be detected.

FIG. 5 is a conceptual graph illustrating an example of the method for calculating the spatial coordinates of the object to be detected. In FIG. 5, the horizontal axis indicates the first data Rx (corresponding to the position of the object to be detected F in the Dx direction in the detection region AA) in the X direction of the spatial coordinates R (Rx, Ry, Rz). The vertical axis indicates the third data Rz (corresponding to the position of the object to be detected F in the Dz direction) in the Z direction of the spatial coordinates R (Rx, Ry, Rz).

The calculation value represented by the solid line in FIG. 5 is obtained by interpolation using detection values Vdet(n) of the electrodes 12, for example. The method for calculating the calculation value illustrated in FIG. 5 is not limited to interpolation and may be approximation, for example.

In the present disclosure, the third data Rz in the Z direction of the spatial coordinates R (Rx, Ry, Rz) satisfies "Rz=0" when the object to be detected F fails to be detected. In other words, the third data Rz in the Z direction of the spatial coordinates R (Rx, Ry, Rz) is smaller as the object to be detected F is positioned farther from the sensor region 10 and is larger as the object to be detected F is positioned closer to the sensor region 10.

Figure 6:
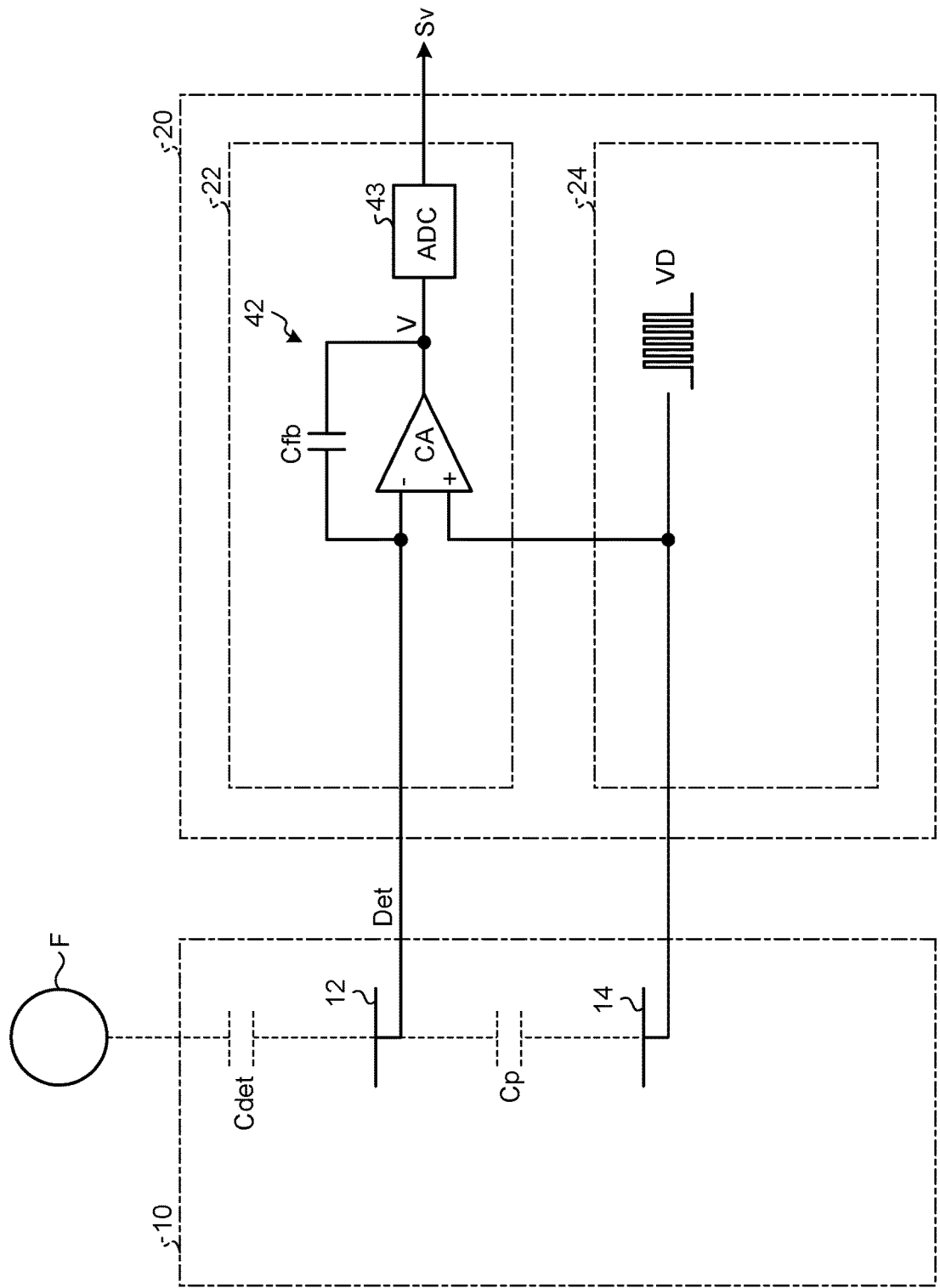
FIG. 6 is a diagram of an example of a coupling configuration between a sensor region and a detector.

FIG. 6 is a diagram of an example of the coupling configuration between the sensor region and the detector. FIG. 6 illustrates the configuration of the sensor region 10 and the detector 20.

As illustrated in FIG. 6, the signal detector 42 of the detection circuit 22 includes a differential amplifier circuit CA as a main component.

The non-inverting input terminal of the differential amplifier circuit CA is supplied with drive signals VD for detection from a power supply circuit 24. The drive signal VD is a square wave signal that repeats a high potential and a low potential in a predetermined cycle.

The inverting input terminal of the differential amplifier circuit CA is coupled to the electrode 12 provided in the detection region AA. Negative feedback capacitor Cfb is provided between the inverting input terminal and the output terminal of the differential amplifier circuit CA. The differential amplifier circuit CA functions as an integration circuit by the drive signals VD being supplied to the non-inverting input terminal.

As illustrated in FIG. 6, the shield electrode 14 is supplied with the drive signals VD from the power supply circuit 24.

As described above, the detection device 1 according to the present disclosure is configured to detect the spatial coordinates of the position where the object to be detected F is present on or above the detection region AA by detecting the capacitance generated at the electrodes 12. Therefore, it is necessary to increase the detection sensitivity compared to the configuration that detects the planar coordinates of the object to be detected F contacting the detection surface. As a result, the detection device 1 is more likely to be affected by parasitic capacitance Cp generated between the electrode 12 and a conductor, such as the shield electrode 14. An output value Sv obtained in a detection operation is expressed by the following Expression (1), where S(Cdet) is a component caused by capacitance Cdet generated between the object to be detected F and the electrode 12, and S(Cp) is a component caused by the parasitic capacitance Cp.

$$Sv = S(Cdet) + S(Cp) \qquad (1)$$

The detection device 1 according to the present disclosure determines the parasitic capacitance component S(Cp), which has been obtained in advance when the object to be detected F is not present in the space where the object to be detected F can be detected on the detection region AA, to be a detection reference value BL. The detection device 1 subtracts the detection reference value BL from the output value Sv of the electrode 12 obtained in the detection operation, thereby calculating the detection value Vdet from which the parasitic capacitance component is removed. The detection value Vdet is expressed by the following Expression (2).

$$Vdet = S - BL \qquad (2)$$

The detection device 1 according to the present disclosure employs what is called a self-capacitance method, that is, a detection method of detecting the object to be detected F by causing a single electrode 12 to generate an electric field. Alternatively, the detection device 1 may employ what is called a mutual capacitance method, that is, a detection method of detecting the object to be detected F by generating an electric field by transmission and reception between the electrodes 12.

Figure 7A:
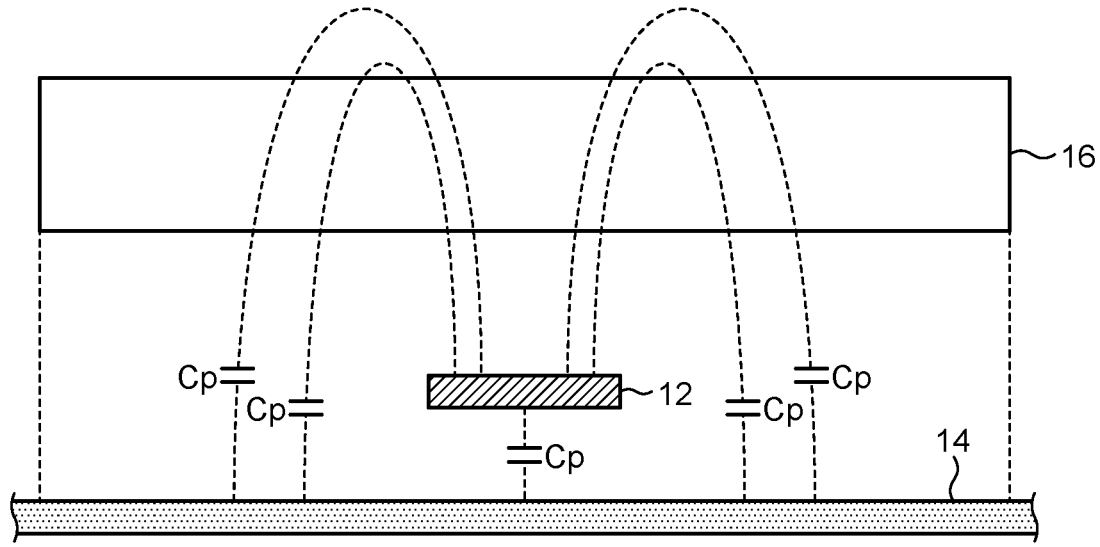
FIG. 7A is a conceptual diagram of capacitance generated at the electrodes.
Figure 7B:
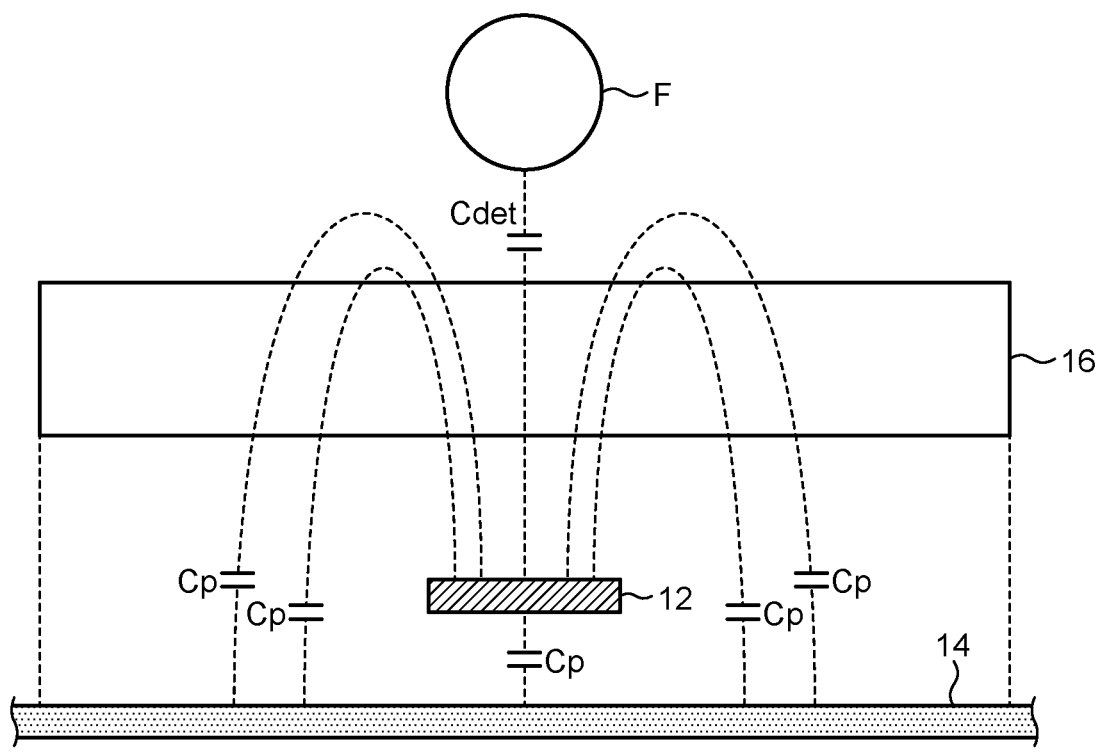
FIG. 7B is a conceptual diagram of the capacitance generated at the electrodes.

FIGS. 7A and 7B are conceptual diagrams of the capacitance generated at the electrodes. FIG. 7A illustrates the parasitic capacitance Cp generated at the electrode 12 when no detectable object to be detected F is present in the space on the upper side of the electrode 12 with the front plate 16 interposed therebetween. FIG. 7B illustrates the capacitance Cdet and the parasitic capacitance Cp generated at the electrode 12 when the object to be detected F is present in the space on the upper side of the electrode 12. FIGS. 7A and 7B illustrate the parasitic capacitance Cp generated between the electrode 12 and the shield electrode 14 along the lines of electric force conceptually represented by the dashed lines.

If the object to be detected F is present in the space on the electrode 12 with the front plate 16 interposed therebetween as illustrated in FIG. 7B, the object to be detected F blocks the lines of electric force from the space on the front plate 16, and the total amount of the parasitic capacitance Cp decreases. Therefore, the detection reference value BL obtained when the object to be detected F is not present is larger than the parasitic capacitance component S(Cp) included in the output value Sv obtained when the object to be detected F is present in the space on the upper side of the electrode 12.

As illustrated in FIG. 7B, the sensor region 10 can detect the object to be detected F by the capacitance Cdet generated between the object to be detected F and the electrode 12.

The following describes the relation between the distance between the sensor region 10 and the object to be detected F and the determining operation in the gesture determination process, which will be described later, with reference to FIGS. 8A and 8B. FIGS. 8A and 8B are schematics of the relation between the distance between the sensor region and the object to be detected and the determining operation. In the following description, the determining operation corresponding to the movement of the object to be detected F in the space on the detection surface S is also referred to as a "determining gesture".

As illustrated in FIG. 8A, the detection device 1 according to the embodiment detects that a determining gesture is performed when the distance D between the upper surface of the sensor region 10 and the object to be detected F in the Dz direction (third direction) is the first distance D1th to the second distance D2th (D1th≤D≤D2th) and when the movement speed of the object to be detected F in the space on the detection region AA (corresponding to a movement amount ΔRxy per unit time in the XY plane of the spatial coordinates R (Rx, Ry, Rz) and a movement amount ΔRz per unit time in the Z direction, which will be described later) is equal to or smaller than a predetermined value (corresponding to a movement amount threshold $\Delta Rxy\_th$ in the XY plane for the spatial coordinates R (Rx, Ry, Rz) and a first movement amount threshold $\Delta Rz\_th1$ in the Z direction, which will be described later). In other words, the detection device 1 detects that a determining gesture is performed when the object to be detected F can be assumed to be stationary at a position closer to the detection surface S than the second distance D2th.

As illustrated in FIG. 8B, the detection device 1 according to the embodiment detects that a determining gesture is performed when the distance D between the upper surface of the sensor region 10 and the object to be detected F in the Dz direction (third direction) is equivalent to the first distance D1th (D=D1th). In other words, when the object to be detected F is in contact with the detection surface S, the detection device 1 detects that a determining gesture is performed.

As illustrated in FIG. 8C, the detection device 1 according to the embodiment fails to detect that a determining gesture is performed when the distance D between the upper surface of the sensor region 10 and the object to be detected F in the Dz direction (third direction) is larger than the second distance D2th and within a third distance D3th (D2th<D≤D3th). The third distance D3th is an insensitive region with no detection sensitivity.

With this configuration, the detection device 1 can detect the object to be detected F even if the front plate 16 has a larger thickness. Therefore, the front plate 16 has higher strength and can be manufactured without thin plate processing.

Figure 9:
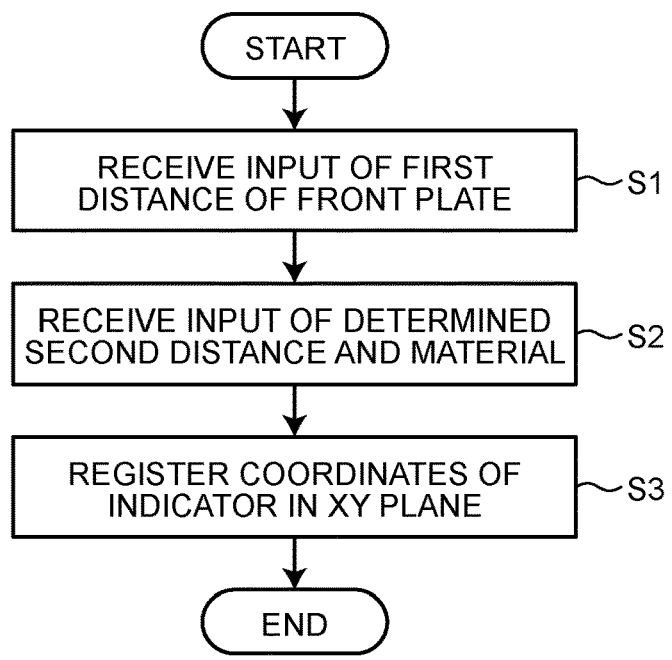
FIG. 9 is a flowchart of an example of an initial setting process for the front plate in the detection device according to the first embodiment.

FIG. 9 is a flowchart of an example of the initial setting process for the front plate in the detection device according to the first embodiment.

As illustrated in FIG. 9, the initial setter 47 instructs the user to input the first distance of the front plate 16 (Step S1). The user inputs the numerical value of the first distance D1th. The initial setter 47 receives the input numerical value of the first distance D1th. The initial setter 47 determines the detection surface S based on the first distance D1th.

Subsequently, the initial setter 47 instructs the user to input the second distance D2th (Step S2). The user inputs the numerical value of the second distance D2th. The initial setter 47 receives the input numerical value of the second distance D2th. The initial setter 47 initially sets the numerical value of the second distance D2th.

Subsequently, the user inputs the numerical value of the material (e.g., permittivity) of the front plate 16. The initial setter 47 receives the input numerical value of the material of the front plate 16. The initial setter 47 initially sets the numerical value of the material of the front plate 16.

Subsequently, the initial setter 47 registers the XY coordinates of the indicators in the XY plane where the object to be detected F can be detected on or above the first indicator ON and the second indicator OFF disposed on the surface of the front plate 16 (Step S3).

The storage 46 stores therein the registered XY coordinates of the indicators in the XY plane.

Subsequently, the gesture determination processor 45 determines whether the XY coordinates of the indicators in the XY plane stored in the storage 46 match the XY coordinates (Rx, Ry) of the position where the object to be detected F is present.

If the gesture determination processor 45 determines that the XY coordinates of the indicators match the XY coordinates (Rx, Ry), it transmits, to the output circuit 26, a command to drive the object to be controlled AX. If the gesture determination processor 45 does not determine that the XY coordinates of the indicators match the XY coordinates (Rx, Ry), it does not transmit, to the output circuit 26, the command to drive the object to be controlled AX.

If the XY coordinates of the first indicator ON used to drive the object to be controlled AX match the spatial coordinates R (Rx, Ry) of the object to be detected F, the output circuit 26 drives the object to be controlled AX.

If the XY coordinates of the second indicator OFF used to stop driving the object to be controlled AX match the spatial coordinates R (Rx, Ry) of the object to be detected F, the output circuit 26 stops driving the object to be controlled AX.

Figure 10:
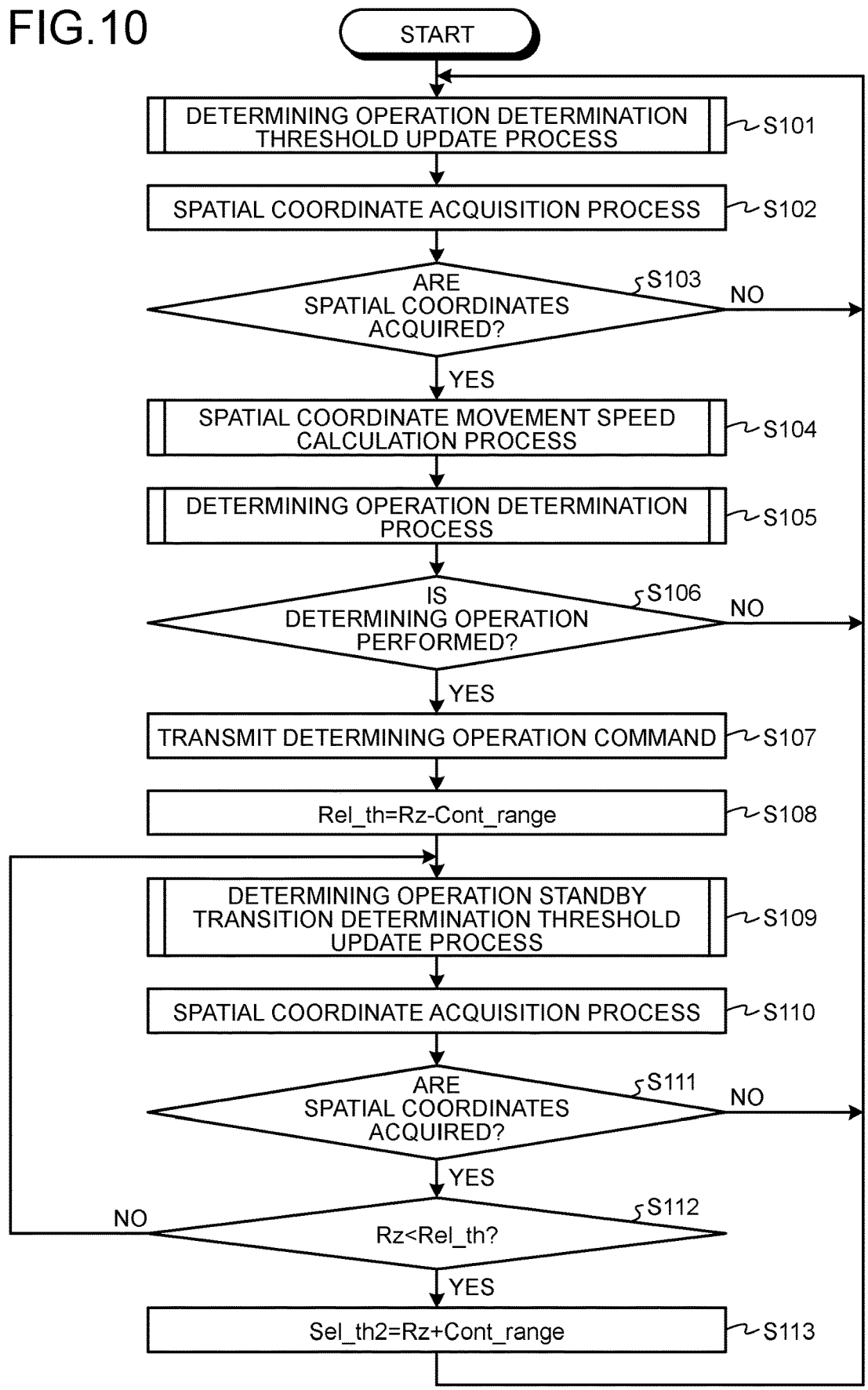
FIG. 10 is a flowchart of an example of a gesture determination process in the detection device according to the first embodiment.
Figure 11:
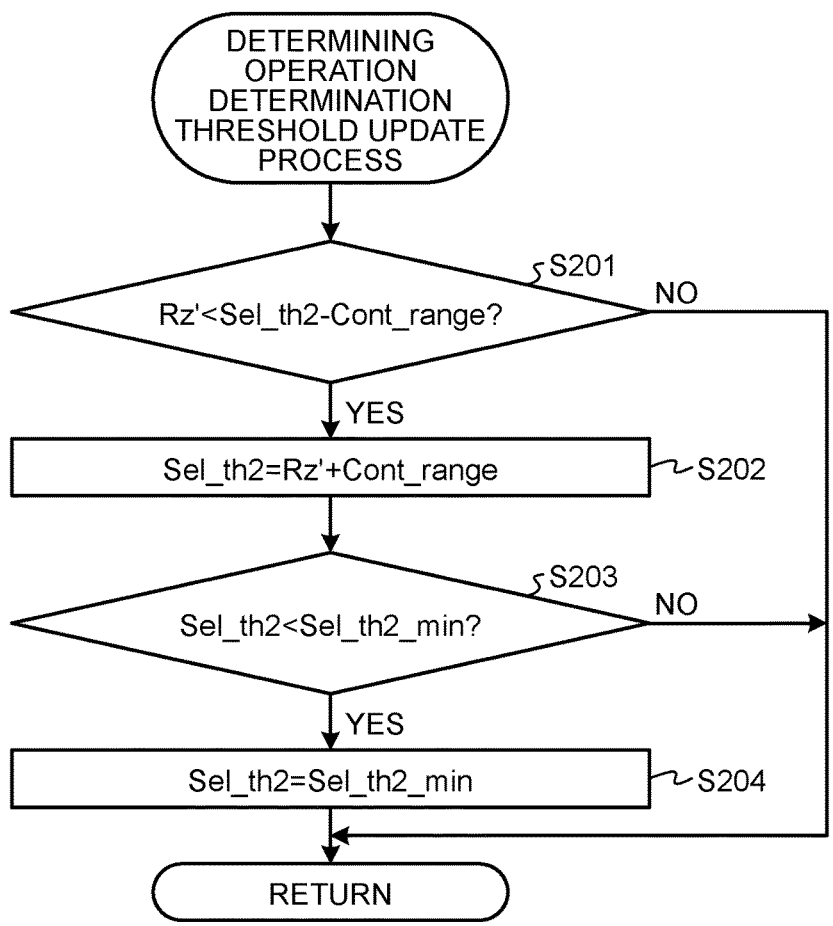
FIG. 11 is a sub-flowchart of an example of a determining operation determination threshold update process illustrated in FIG. 10.
Figure 12:
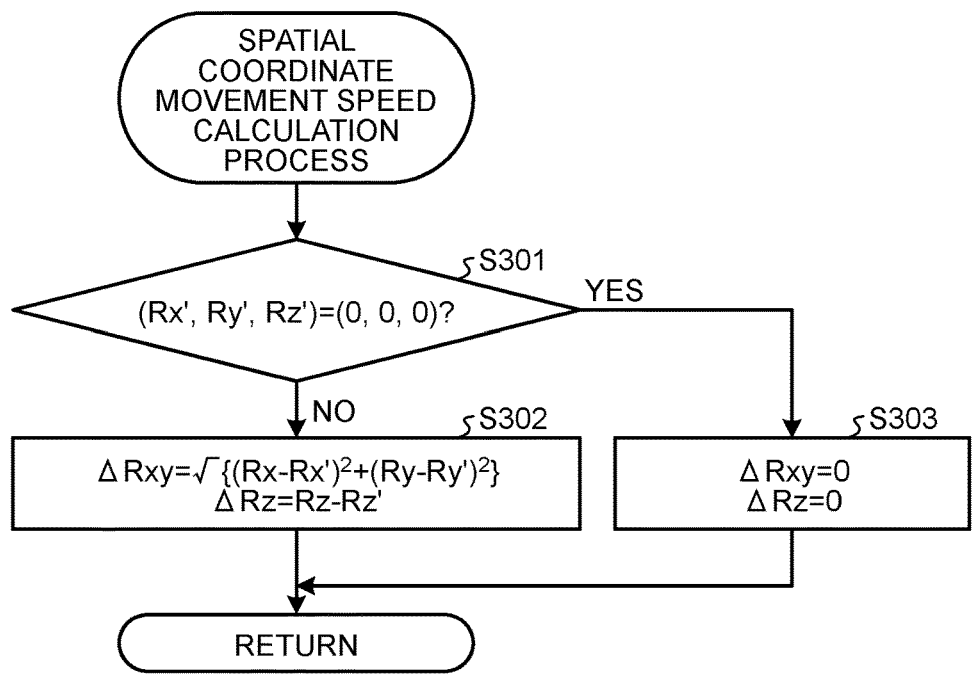
FIG. 12 is a sub-flowchart of an example of a spatial coordinate movement speed calculation process illustrated in FIG. 10.
Figure 13:
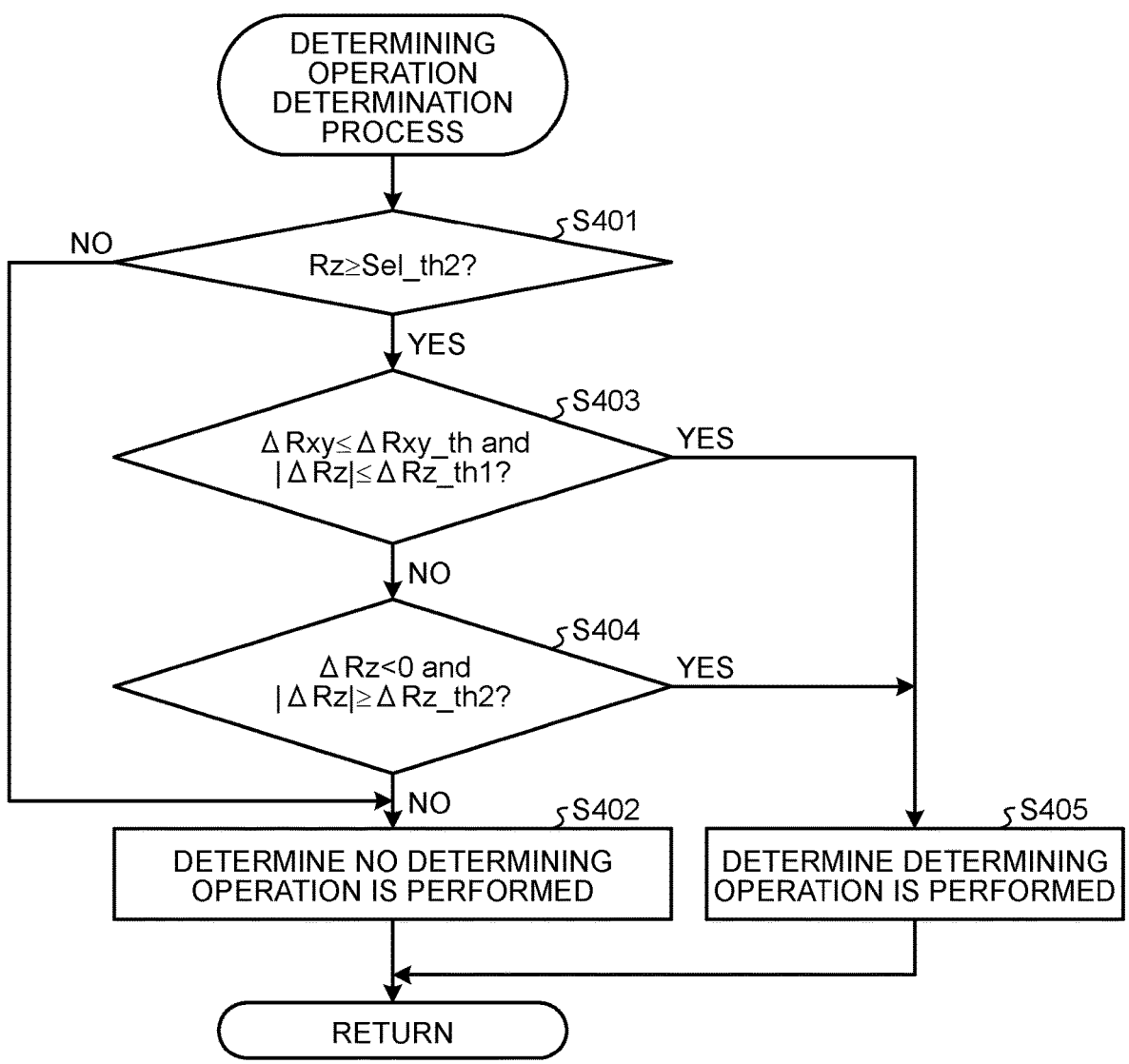
FIG. 13 is a sub-flowchart of an example of a determining operation determination process illustrated in FIG. 10.
Figure 14:
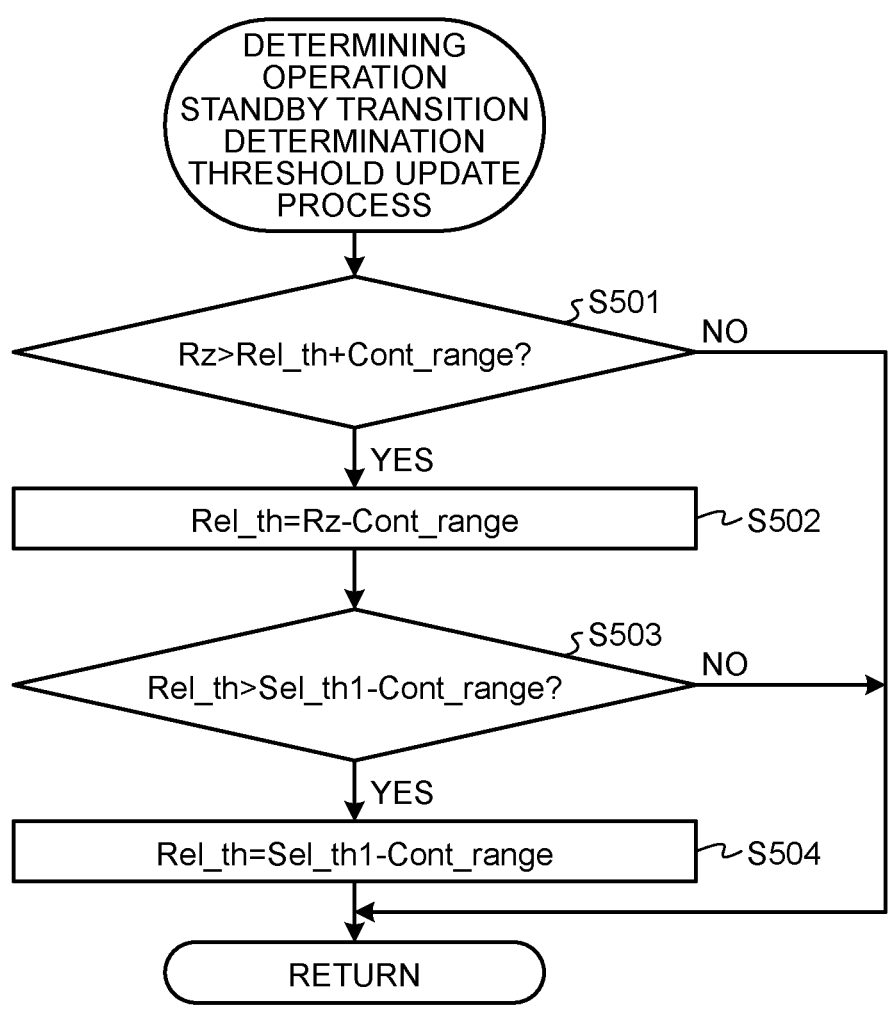
FIG. 14 is a sub-flowchart of an example of a determining operation standby transition determination threshold update process illustrated in FIG. 10.
Figure 15:
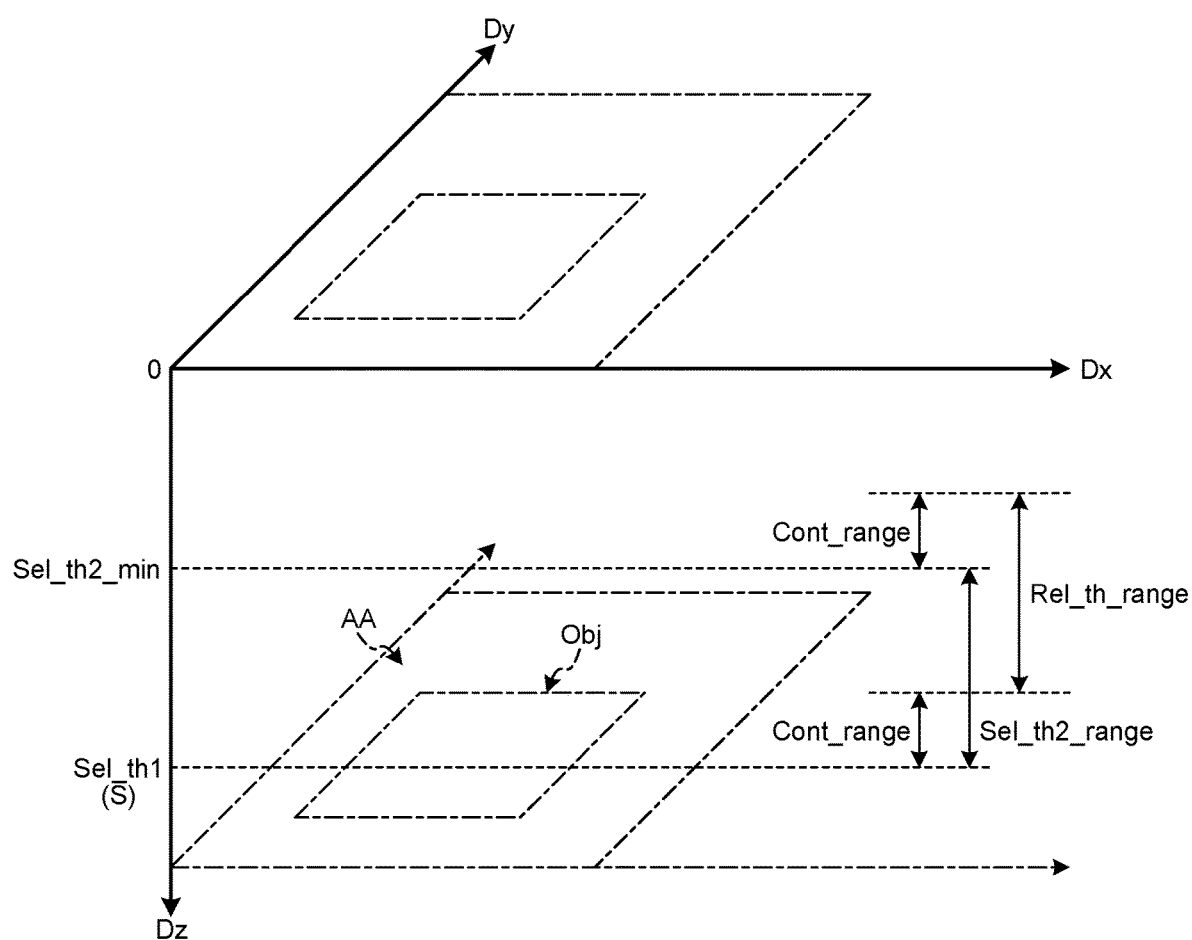
FIG. 15 is a conceptual diagram of various thresholds in the gesture determination process.

The following describes specific examples of the gesture determination process in the detection device 1 according to the embodiment with reference to FIGS. 10, 11, 12, 13, 14, and 15. FIG. 10 is a flowchart of an example of the gesture determination process in the detection device according to the first embodiment. FIG. 11 is a sub-flowchart of an example of a determining operation determination threshold update process illustrated in FIG. 10. FIG. 12 is a sub-flowchart of an example of a spatial coordinate movement speed calculation process illustrated in FIG. 10. FIG. 13 is a sub-flowchart of an example of a determining operation determination process illustrated in FIG. 10. FIG. 14 is a sub-flowchart of an example of a determining operation standby transition determination threshold update process illustrated in FIG. 10. FIG. 15 is a conceptual diagram of various thresholds in the gesture determination process.

As illustrated in FIG. 15, the storage 46 stores therein a first determining operation determination threshold Sel_th1 corresponding to the detection surface S (corresponding to the first distance D1th illustrated in FIGS. 8A and 8B), a second determining operation determination threshold minimum value Sel_th2_min, and an offset value Cont_range as parameters to perform the gesture determination process illustrated in FIG. 10. The first determining operation determination threshold Sel_th1 and the second determining operation determination threshold minimum value Sel_th2_min are set values for the position of the object to be detected F in the Dz direction, that is, the third data Rz in the Z direction of the spatial coordinates R (Rx, Ry, Rz). The offset value Cont_range is used to calculate a second determining operation determination threshold Sel_th2 (corresponding to the second distance D2th illustrated in FIGS. 8A and 8B) and a determining operation standby determination threshold Rel_th in each processing of the gesture determination process.

In a determining gesture determination standby state, if the third data Rz in the Z direction of the spatial coordinates R (Rx, Ry, Rz) is equal to or larger than the first determining operation determination threshold Sel_th1, the gesture determination processor 45 determines that the determining gesture is performed (Steps S101 to S108 in the gesture determination process illustrated in FIG. 10) and shifts to a release standby state. In the release standby state after determining the determining operation, if the third data Rz in the Z direction of the spatial coordinates R (Rx, Ry, Rz) is smaller than a value obtained by subtracting the offset value Cont_range from the first determining operation determination threshold Sel_th1 (Steps S109 to S113 illustrated in FIG. 10), the gesture determination processor 45 shifts to the determination standby state.

In the determining gesture determination standby state, under the condition that the third data Rz in the Z direction of the spatial coordinates R (Rx, Ry, Rz) is equal to or larger than the second determining operation determination threshold minimum value Sel_th2_min and smaller than the first determining operation determination threshold Sel_th1, if the movement speed of the spatial coordinates R (Rx, Ry, Rz) in the space in the detection region AA is equal to or smaller than a predetermined value, or the movement speed in a minus direction of the third data Rz in the Z direction of the spatial coordinates R (Rx, Ry, Rz) is equal to or larger than a predetermined value, the gesture determination processor 45 determines that the determining gesture is performed (Steps S101 to S108 in the gesture determination process illustrated in FIG. 10) and shifts to the release standby state. In the release standby state after determining the determining operation, if the third data Rz in the Z direction of the spatial coordinates R (Rx, Ry, Rz) is smaller than a value obtained by subtracting the offset value Cont_range from the position where the third data Rz is the maximum in a range of equal to or larger than the second determining operation determination threshold minimum value Sel_th2_min and smaller than the first determining operation determination threshold value Sel_th1 (Steps S109 to S113 illustrated in FIG. 10), the gesture determination processor 45 shifts to the determination standby state.

As preconditions for the gesture determination process illustrated in FIG. 10, the storage 46 stores therein first data Rx', second data Ry', and third data Rz' of spatial coordinates R' (Rx', Ry', Rz') in previous processing (Steps S103, S106, S111, and S113, which will be described later), the second determining operation determination threshold Sel_th2, and the determining operation standby determination threshold Rel_th. The gesture determination processor 45 of the processing circuit 23 first performs a determining operation determination threshold update process illustrated in FIG. 11 (Step S101 in FIG. 10).

In the determination standby state, the gesture determination processor 45 reads the third data Rz' in the previous processing from the storage 46 and determines whether the third data Rz' in the previous processing is smaller than a value obtained by subtracting the offset value Cont_range from the second determining operation determination threshold Sel_th2 (Rz'<Sel_th2−Cont_range) (Step S201).

If the third data Rz' in the previous processing is equal to or larger than the value obtained by subtracting the offset value Cont_range from the second determining operation determination threshold Sel_th2 (Rz'≥Sel_th2−Cont_range) (No at Step S201), the gesture determination processor 45 returns to the gesture determination process illustrated in FIG. 10.

If the third data Rz' in the previous processing is smaller than the value obtained by subtracting the offset value Cont_range from the second determining operation determination threshold Sel_th2 (Rz'<Sel_th2−Cont_range) (Yes at Step S201), the gesture determination processor 45 sets the second determining operation determination threshold Sel_th2 to a value obtained by adding the offset value Cont_range to the third data Rz' in the previous processing (Sel_th2=Rz'+Cont_range) (Step S202). Subsequently, the gesture determination processor 45 determines whether the second determining operation determination threshold Sel_th2 is smaller than the second determining operation determination threshold minimum value Sel_th2_min (Sel_th2<Sel_th2_min) (Step S203).

If the second determining operation determination threshold Sel_th2 is equal to or larger than the second determining operation determination threshold minimum value Sel_th2_min (Sel_th2≥Sel_th2_min) (No at Step S203), the gesture determination processor 45 stores the second determining operation determination threshold Sel_th2 calculated at Step S202 in the storage 46 and returns to the gesture determination process illustrated in FIG. 10.

If the second determining operation determination threshold Sel_th2 is smaller than the second determining operation determination threshold minimum value Sel_th2_min (Sel_th2<Sel_th2_min) (Yes at Step S203), the gesture determination processor 45 stores the second determining operation determination threshold minimum value Sel_th2_min in the storage 46 as the second determining operation determination threshold Sel_th2 (Step S204) and returns to the gesture determination process illustrated in FIG. 10.

Referring back to FIG. 10, the gesture determination processor 45 performs a process of acquiring the spatial coordinates R (Rx, Ry, Rz) from the coordinate calculator 44 (Step S102) and determines whether the spatial coordinates R (Rx, Ry, Rz) can be acquired (Step S103). If the spatial coordinates R (Rx, Ry, Rz) fail to be acquired (No at Step S103), the gesture determination processor 45 stores the spatial coordinates R' (Rx', Ry', Rz') that satisfy the first data in the X direction Rx'=0, the second data in the Y direction Ry'=0, and the third data in the Z direction Rz'=0 in the storage 46 and returns to the determining operation determination threshold update process (FIG. 11) at Step S101.

If the spatial coordinates R (Rx, Ry, Rz) are acquired (Yes at Step S103), the gesture determination processor 45 performs a spatial coordinate movement speed calculation process illustrated in FIG. 12 (Step S104 in FIG. 10).

The gesture determination processor 45 reads, from the storage 46, the first data Rx' in the X direction, the second data Ry' in the Y direction, and the third data Rz' in the Z direction of the spatial coordinates R' (Rx', Ry', Rz') in the previous processing. The gesture determination processor 45 then determines whether the spatial coordinates R' (Rx', Ry', Rz') in the previous processing satisfy the first data in the X direction Rx'=0, the second data in the Y direction Ry'=0, and the third data in the Z direction Rz'=0 (Step S301). If the spatial coordinates R' (Rx', Ry', Rz') in the previous processing satisfy the first data in the X direction Rx'=0, the second data in the Y direction Ry'=0, and the third data in the Z direction Rz'=0, it indicates that the spatial coordinates R (Rx, Ry, Rz) fail to be acquired in the previous processing (No at Step S103).

If the spatial coordinates R' (Rx', Ry', Rz') in the previous processing do not satisfy the first data in the X direction Rx'=0, the second data in the Y direction Ry'=0, or the third data in the Z direction Rz'=0 (No at Step S301), in other words, if the spatial coordinates R (Rx, Ry, Rz) are acquired in the previous processing (Yes at Step S103), the gesture determination processor 45 calculates the movement speed in the Dx-Dy plane and the movement speed in the Dz direction (Step S302) and returns to the gesture determination process illustrated in FIG. 10.

The movement speed in the Dx-Dy plane corresponds to the movement amount ΔRxy per unit time in the XY plane, and the movement speed in the Dz direction corresponds to the movement amount ΔRz per unit time in the Z direction. In FIG. 12, the gesture determination processor 45, for example, calculates the movement amount ΔRxy per unit time in the XY plane as the movement speed in the Dx-Dy plane as expressed by the following Expression (3) and calculates the movement amount ΔRz per unit time in the Z direction as the movement speed in the Dz direction as expressed by the following Expression (4). In the present disclosure, the process of acquiring the spatial coordinates R (Rx, Ry, Rz) may be performed in a sampling cycle in the A/D converter 43. Alternatively, the spatial coordinates R (Rx, Ry, Rz) may be acquired in a plurality of sampling cycles. The spatial coordinates R (Rx, Ry, Rz) simply need to be acquired in a predetermined cycle, and the present disclosure is not limited by the acquisition cycle of the spatial coordinates R (Rx, Ry, Rz).

$$\Delta Rxy = \sqrt{\{(Rx - Rx')^2 + (Ry - Ry')^2\}} \quad (3)$$

$$\Delta Rz = Rz - Rz' \quad (4)$$

If the spatial coordinates R' (Rx', Ry', Rz') in the previous processing satisfy the first data in the X direction Rx'=0, the second data in the Y direction Ry'=0, and the third data in the Z direction Rz'=0 (Yes at Step S301), in other words, if the spatial coordinates R (Rx, Ry, Rz) fail to be acquired in the previous processing (No at Step S103), the gesture determination processor 45 determines that the movement amount ΔRxy in the XY plane satisfies ΔRxy=0 and that the movement amount ΔRz in the Z direction satisfies ΔRz=0 (Step S303) and returns to the gesture determination process illustrated in FIG. 10.

The gesture determination processor 45 performs a determining operation determination process illustrated in FIG. 13 (Step S105 in FIG. 10).

The gesture determination processor 45 determines whether the third data Rz in the Z direction of the spatial coordinates R (Rx, Ry, Rz) is equal to or larger than the second determining operation determination threshold Sel_th2 (Rz≥Sel_th2) (Step S401). If the third data Rz in the Z direction of the spatial coordinates R (Rx, Ry, Rz) is smaller than the second determining operation determination threshold Sel_th2 (Rz<Sel_th2) (No at Step S401), the gesture determination processor 45 determines that no determining gesture is performed (Step S402) and returns to the gesture determination process illustrated in FIG. 10.

If the third data Rz is equal to or larger than the second determining operation determination threshold Sel_th2 (Rz≥Sel_th2) (Yes at Step S401), the gesture determination processor 45 determines whether the movement amount ΔRxy per unit time in the XY plane is equal to or smaller than the movement amount threshold ΔRxy_th in the XY plane, and a magnitude |ΔRz| of the movement amount per unit time in the Z direction is equal to or smaller than the first movement threshold ΔRz_th1 in the Z direction (ΔRxy≤ΔRxy_th and |ΔRz|≤ΔRz_th1) (Step S403).

If the movement amount ΔRxy per unit time in the XY plane is equal to or smaller than the movement amount threshold ΔRxy_th in the XY plane, and the magnitude |ΔRz| of the movement amount per unit time in the Z direction is equal to or smaller than the first movement amount threshold ΔRz_th1 in the Z direction (ΔRxy≤ΔRxy_th and |ΔRz|≤ΔRz_th1) (Yes at Step S403), the gesture determination processor 45 determines that a determining operation is performed (Step S405) and returns to the gesture determination process illustrated in FIG. 10.

If the movement amount ΔRxy per unit time in the XY plane is larger than the movement amount threshold ΔRxy_th in the XY plane, or if the magnitude |ΔRz| of the movement amount per unit time in the Z direction is larger than the first movement amount threshold ΔRz_th1 in the Z direction (ΔRxy>ΔRxy_th or |ΔRz|>ΔRz_th1) (No at Step S403), the gesture determination processor 45 determines whether the movement amount per unit time in the Z direction is a negative value, and the magnitude |ΔRz| of the movement amount per unit time in the Z direction is equal to or larger than a second movement amount threshold ΔRz_th2 in the Z direction (ΔRz<0 and |ΔRz|≥ΔRz_th2) (Step S404).

If the movement amount per unit time in the z direction is a negative value, and the magnitude |ΔRz| of the movement amount per unit time in the Z direction is equal to or larger than the second movement amount threshold ΔRz_th2 in the Z direction (ΔRz<0 and |ΔRz|≥ΔRz_th2) (Yes at Step S404), the gesture determination processor 45 determines that a determining gesture is performed (Step S405) and returns to the gesture determination process illustrated in FIG. 10.

If the movement amount per unit time in the Z direction is a positive value, or the magnitude |ΔRz| of the movement amount per unit time in the Z direction is smaller than the second movement amount threshold ΔRz_th2 in the Z direction (ΔRz>0 or |ΔRz|<ΔRz_th2) (No at Step S404), the gesture determination processor 45 determines that no determining gesture is performed (Step S402) and returns to the gesture determination process illustrated in FIG. 10.

Referring back to FIG. 10, the gesture determination processor 45 checks the results of the determining operation determination process illustrated in FIG. 13 (Step S106).

If no determining operation is performed (No at Step S106), the gesture determination processor 45 stores the spatial coordinates R (Rx, Ry, Rz) acquired at Step S102 in the storage 46 as the spatial coordinates R' (Rx', Ry', Rz') and returns to the determining operation determination threshold update process (FIG. 11) at Step S101.

If a determining gesture is performed (Yes at Step S106), the processing circuit 23 transmits a determining operation command indicating that the determining gesture is performed, to the output circuit 26 via the interface circuit 25, which is a USB controller IC, for example (Step S107).

Subsequently, the gesture determination processor 45 sets the determining operation standby determination threshold Rel_th. Specifically, the gesture determination processor 45 sets a value obtained by subtracting the offset value Cont_range from the third data Rz in the Z direction of the spatial coordinates R (Rx, Ry, Rz) as the determining operation standby determination threshold Rel_th (Rel_th=Rz−Cont_range) (Step S108). Subsequently, the gesture determination processor 45 shifts to a release standby state and performs a determining operation standby transition determination threshold update process illustrated in FIG. 14 (Step S109 in FIG. 10).

In the release standby state after determining the determining operation, the gesture determination processor 45 determines whether the third data Rz in the Z direction of the spatial coordinates R (Rx, Ry, Rz) is larger than a value obtained by adding the offset value Cont_range to the determining operation standby determination threshold Rel_th (Rz>Rel_th+Cont_range) (Step S501).

If the third data Rz is equal to or smaller than the value obtained by adding the offset value Cont_range to the determining operation standby determination threshold Rel_th (Rz≤Rel_th+Cont_range) (No at Step S501), the gesture determination processor 45 returns to the gesture determination process illustrated in FIG. 10.

If the third data Rz is larger than the value obtained by adding the offset value Cont_range to the determining operation standby determination threshold Rel_th (Rz>Rel_th+Cont_range) (Yes at Step S501), the gesture determination processor 45 sets the determining operation standby determination threshold Rel_th to a value obtained by subtracting the offset value Cont_range from the third data Rz (Rel_th=Rz−Cont_range) (Step S502). Subsequently, the gesture determination processor 45 determines whether the determining operation standby determination threshold Rel_th is larger than a value obtained by subtracting the offset value Cont_range from the first determining operation determination threshold Sel_th1 (Rel_th>Sel_th1−Cont_range) (Step S503).

If the determining operation standby determination threshold Rel_th is equal to smaller than the value obtained by subtracting the offset value Cont_range from the first determining operation determination threshold Sel_th1 (Rel_th≤Sel_th1−Cont_range) (No at Step S503), the gesture determination processor 45 stores the determining operation standby determination threshold Rel_th calculated at Step S502 in the storage 46 and returns to the gesture determination process illustrated in FIG. 10.

If the determining operation standby determination threshold Rel_th is larger than the value obtained by subtracting the offset value Cont_range from the first determining operation determination threshold Sel_th1 (Rel_th>Sel_th1−Cont_range) (Yes at Step S503), the gesture determination processor 45 stores the value obtained by subtracting the offset value Cont_range from the first determining operation determination threshold Sel_th1 in the storage 46 as the determining operation standby determination threshold Rel_th (Step S504) and returns to the gesture determination process illustrated in FIG. 10.

Referring back to FIG. 10, the gesture determination processor 45 performs a process of acquiring the spatial coordinates R (Rx, Ry, Rz) from the coordinate calculator 44 (Step S110) and determines whether the spatial coordinates R (Rx, Ry, Rz) can be acquired (Step S111). If the spatial coordinates R (Rx, Ry, Rz) fail to be acquired (No at Step S111), the gesture determination processor 45 stores the spatial coordinates R' (Rx', Ry', Rz') that satisfy the first data Rx'=0, the second data Ry'=0, and the third data Rz'=0 in the storage 46 and returns to the determining operation determination threshold update process (FIG. 11) at Step S101.

If the spatial coordinates R (Rx, Ry, Rz) are acquired (Yes at Step S111), the gesture determination processor 45 determines whether the acquired third data Rz is smaller than the determining operation standby determination threshold Rel_th (Rz<Rel_th) (Step S112). If the third data Rz is equal to or larger than the determining operation standby determination threshold Rel_th (Rz≥Rel_th) (No at Step S112), the gesture determination processor 45 returns to the determining operation standby transition determination threshold update process (FIG. 14) at Step S109.

If the third data Rz is smaller than the determining operation standby determination threshold Rel_th (Rz<Rel_th) (Yes at Step S112), the gesture determination processor 45 sets a value obtained by adding the offset value Cont_range to the third data Rz as the second determining operation determination threshold Sel_th2 (Step S113) and stores the spatial coordinates R (Rx, Ry, Rz) acquired at Step S111 in the storage 46 as the spatial coordinates R' (Rx', Ry', Rz'). Subsequently, the gesture determination processor 45 shifts to the determining gesture determination standby state and returns to the determining operation determination threshold update process (FIG. 11) at Step S101.

According to the gesture determination process described above, a possible range Sel_th2_range of the second determining operation determination threshold Sel_th2 in the determining gesture determination standby state is a range of the second determining operation determination threshold minimum value Sel_th2_min to the first determining operation determination threshold Sel_th1 (Sel_th2_min≤Sel_th2≤Sel_th1) as illustrated in FIG. 15.

Within the possible range Sel_th2_range of the second determining operation determination threshold Sel_th2, if the movement speed of the object to be detected F (movement amount per unit time of the spatial coordinates R (Rx, Ry, Rz)) is equal to or smaller than a predetermined value (Yes at Step S403), or if the negative movement speed of the object to be detected F in the Dz direction (movement amount per unit time in the negative direction of the third data Rz in the Z direction of the spatial coordinates R (Rx, Ry, Rz)) is equal to or larger than a predetermined value (Yes at Step S404), it is determined that a determining gesture is performed.

In the release standby state after determining the determining operation, if the third data Rz in the Z direction of the spatial coordinates R (Rx, Ry, Rz) is larger than the value obtained by adding the offset value Cont_range to the determining operation standby determination threshold Rel_th (Yes at Step S501), the value obtained by subtracting the offset value Cont_range from the third data Rz is set as the determining operation standby determination threshold Rel_th (Rel_th=Rz−Cont_range) (Step S502).

In the release standby state after determining the determining operation, if the third data Rz in the Z direction of the spatial coordinates R (Rx, Ry, Rz) is equal to or smaller than the first determining operation determination threshold Sel_th1 (Yes at Step S503), the value obtained by subtracting the offset value Cont_range from the first determining operation determination threshold Sel_th1 is set as the determining operation standby determination threshold Rel_th (Rel_th=Sel_th1−Cont_range) (Step S504).

As a result, as illustrated in FIG. 15, a possible range Rel_th range of the determining operation standby determination threshold Rel_th is a range of the value subtracting the offset value Cont_range from the second determining operation determination threshold minimum value Sel_th2_min to the value obtained by subtracting the offset value Cont_range from the first determining operation determination threshold Sel_th1 (Sel_th2_min−Cont_range≤Rel_th≤Sel_th1−Cont_range).

Therefore, the XY coordinates of the object to be detected F are stored because the object to be detected F is present on the detection surface S within a range larger than the first distance D1th and equal to or smaller than the second distance D2th, which is a region where the object to be detected F can be detected on the Dz plane (refer to FIGS. 8A and 15).

If the XY coordinates of the registered indicator on the surface of the first indicator ON or the second indicator OFF on the detection surface S match the XY coordinates (Rx, Ry) of the position where the object to be detected F is present, the sensor region 10 stores the object to be detected F in the storage 46 (refer to FIGS. 4B, 9, and 15). With this configuration, the detection device 1 can appropriately determine the gesture of the object to be detected F even if it is attached to the front plate 16 having different thickness or made of different material.

Second Embodiment

Figure 16:
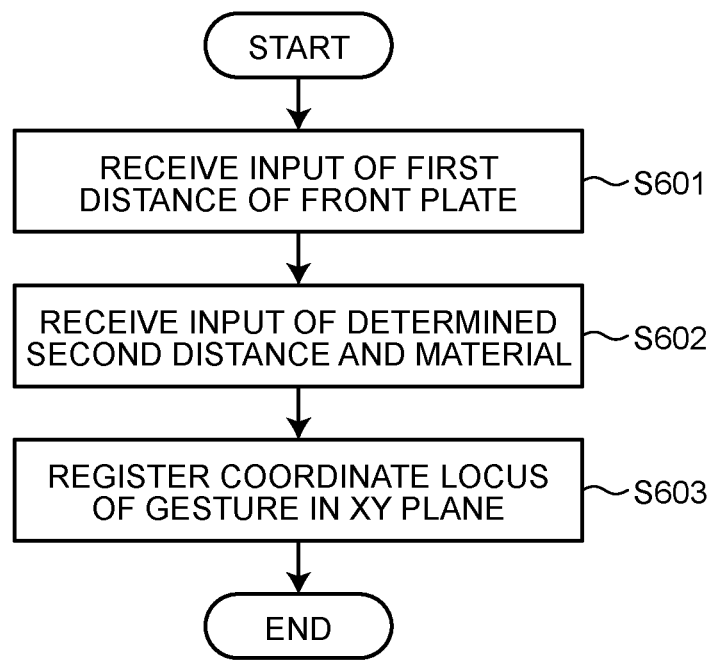
FIG. 16 is a flowchart of an example of the initial setting process for the front plate in the detection device according to a second embodiment.

FIG. 16 is a flowchart of an example of the initial setting process for the front plate in the detection device according to a second embodiment. In the following description, the same components as those described in the embodiment above are denoted by the same reference numerals, and duplicate explanation thereof is omitted.

As illustrated in FIG. 16, Steps S601 and S602 are the same as Steps S1 and S2 described above, and therefore the explanations thereof are omitted.

After performing the processing at Steps S601 and S602 in order, the initial setter 47 registers the XY coordinate locus of a gesture in the XY plane where the object to be detected F can be detected (Step S603). The initial setter 47 registers the XY coordinate locus of the gesture to drive the object to be controlled AX and the coordinate locus of the gesture to stop driving the object to be controlled AX.

The storage 46 stores therein the registered XY coordinate locus of the gesture in the XY plane.

Subsequently, the gesture determination processor 45 determines whether the XY coordinate locus of the gesture in the XY plane stored in the storage 46 matches the coordinate locus of the spatial coordinates R (Rx, Ry) of the position where the object to be detected F is present in the space on the detection surface S.

If the gesture determination processor 45 determines that the XY coordinate locus of the gesture matches the coordinate locus of the spatial coordinates R (Rx, Ry), it transmits, to the output circuit 26, a command to drive the object to be controlled AX. If the gesture determination processor 45 does not determine that the XY coordinate locus of the gesture matches the coordinate locus of the spatial coordinates R (Rx, Ry), it does not transmit, to the output circuit 26, the command to drive the object to be controlled AX.

If the XY coordinate locus of the gesture to drive the object to be controlled AX matches the coordinate locus of the spatial coordinates R (Rx, Ry) of the object to be detected F, the output circuit 26 drives the object to be controlled AX.

If the XY coordinate locus of the gesture to stop driving the object to be controlled AX matches the coordinate locus of the spatial coordinates R (Rx, Ry) of the object to be detected F, the output circuit 26 stops driving the object to be controlled AX.

First Modification

Figure 17:
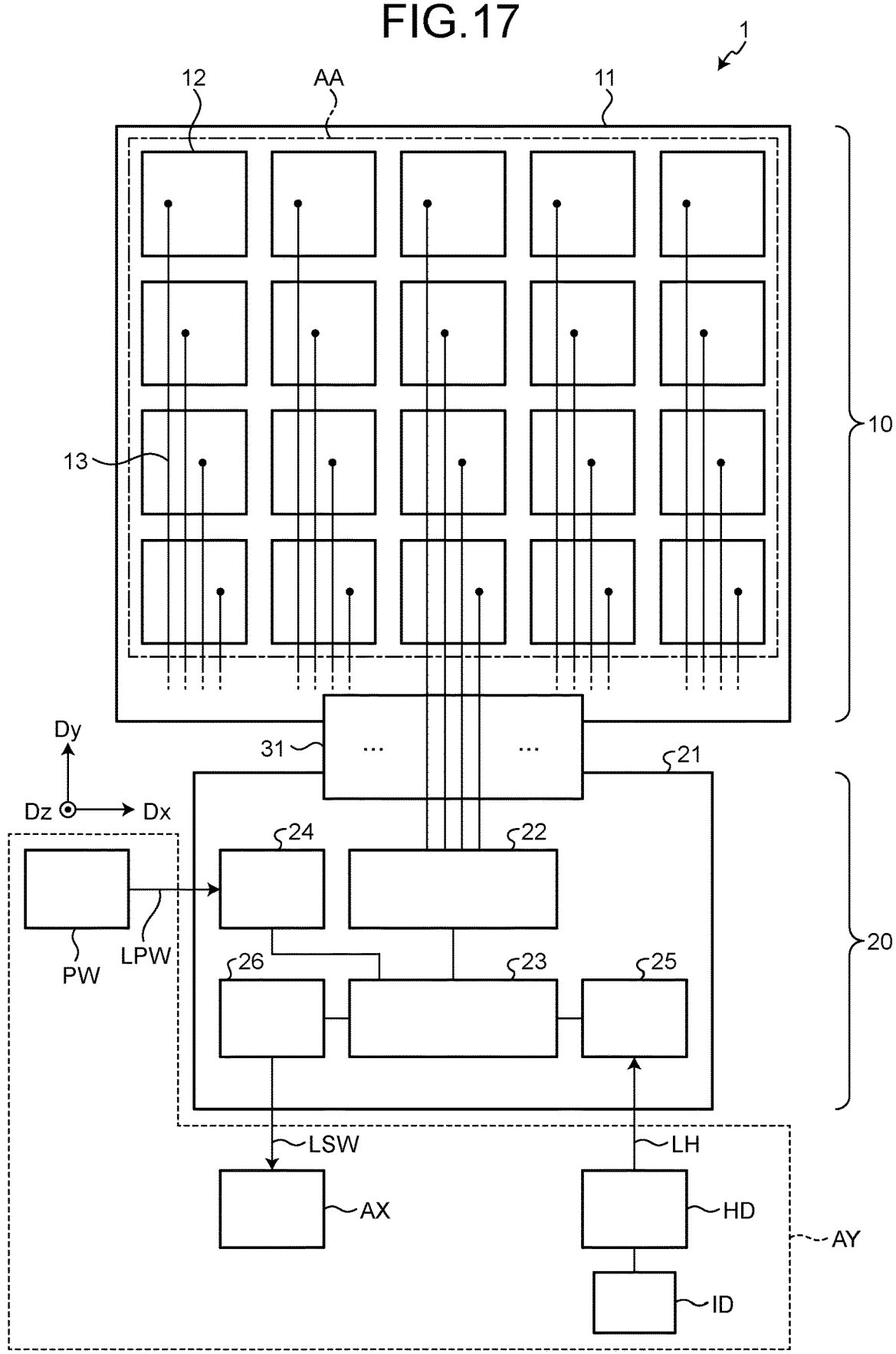
FIG. 17 is a plan view of a schematic configuration of the detection device according to a first modification.

FIG. 17 is a plan view of a schematic configuration of the detection device according to a first modification. In the following description, the same components as those described in the embodiments above are denoted by the same reference numerals, and duplicate explanation thereof is omitted.

As illustrated in FIG. 17, the detection device 1 includes the sensor region 10 and the detector 20.

The detector 20 is coupled to a housing AY. The housing AY accommodates the power supply PW, the object to be controlled AX, the host device HD, and the input device ID. The housing AY is a fan, for example.

Second Modification

Figure 18:
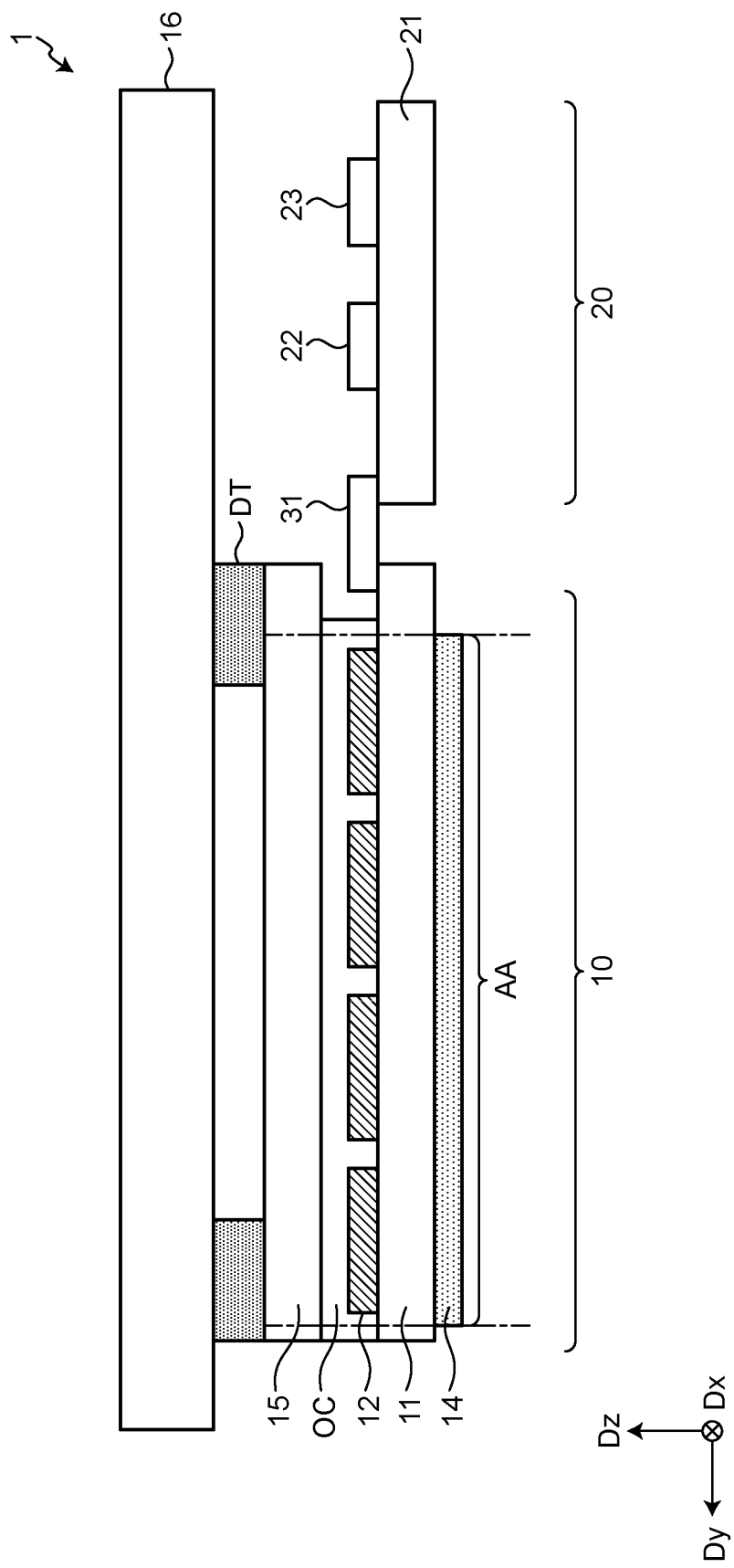
FIG. 18 is a schematic of a sectional configuration for explaining a second modification of the detection device according to the embodiment.

FIG. 18 is a schematic of a sectional configuration for explaining a second modification of the detection device according to the embodiment. In the following description, the same components as those described in the embodiments above are denoted by the same reference numerals, and duplicate explanation thereof is omitted.

A double-sided tape DT is disposed between the front plate 16 and the cover glass 15.

The double-sided tape DT is a sheet adhesive with double-sided adhesion. The double-sided tape DT can bond components on both sides. The double-sided tape DT bonds the back surface of the front plate 16 to both ends of the cover glass 15 to fix the sensor region 10.

Third Modification

Figure 19:
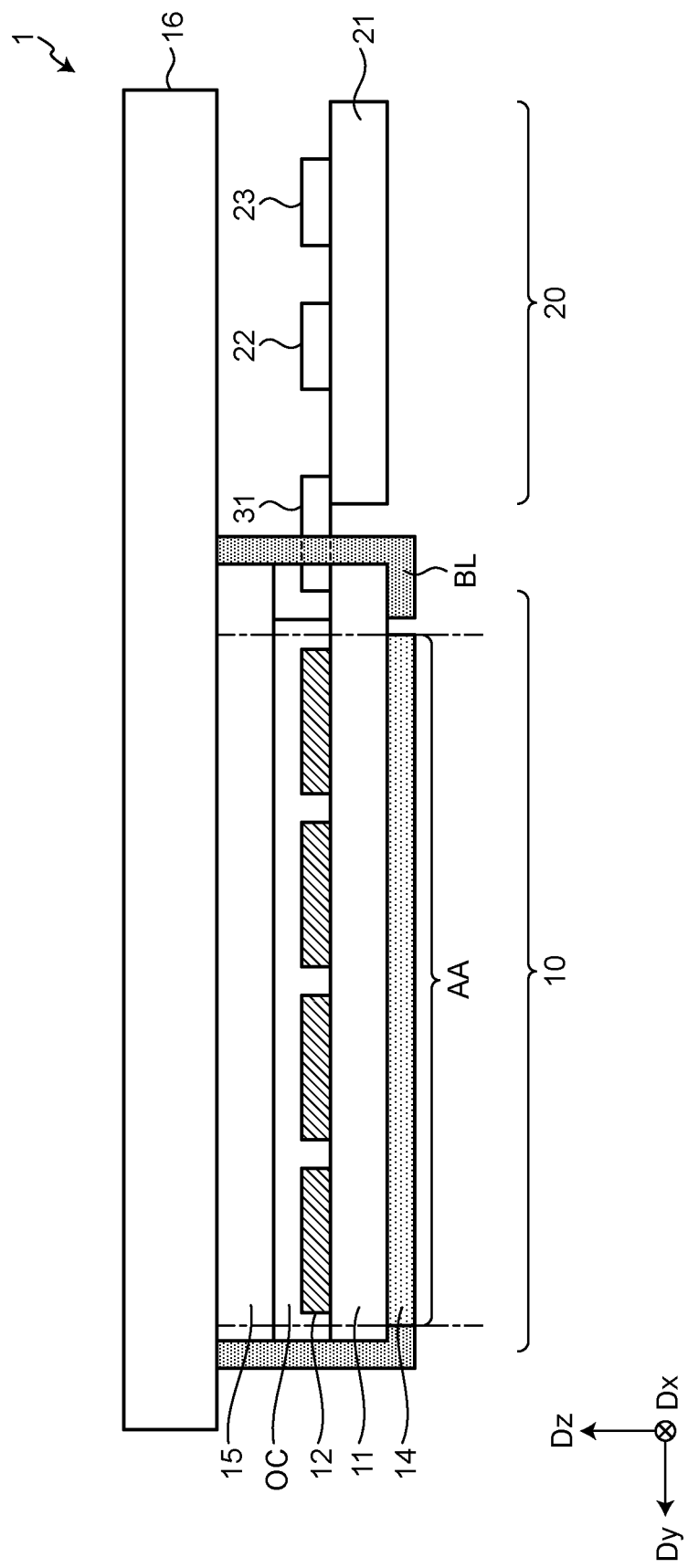
FIG. 19 is a schematic of a sectional configuration for explaining a third modification of the detection device according to the embodiment.

FIG. 19 is a schematic of a sectional configuration for explaining a third modification of the detection device according to the embodiment. In the following description, the same components as those described in the embodiments above are denoted by the same reference numerals, and duplicate explanation thereof is omitted.

A chuck BL is fixed to the back surface of the front plate 16 with its L-shaped ends surrounding both ends of the sensor region 10 to fix the sensor region 10.

The chuck BL is a metal fitting that supports members. Examples of the fixing method using the chuck BL include, but are not limited to, mechanical chuck, magnetic chuck, etc.

The mechanical chuck is a method of fixing the front plate 16 and the sensor region 10 by mechanical stress.

The magnetic chuck is a method of fixing the front plate 16 and the sensor region 10 by magnetic material on the front plate 16 and magnetic material on the sensor region 10 being magnetically attracted to each other. Examples of the magnetic material include, but are not limited to, permanent magnet, electromagnet, etc. The magnetic material may be a combination of permanent magnet and electromagnet.

While exemplary embodiments according to the present disclosure have been described, the embodiments are not intended to limit the present disclosure. The contents disclosed in the embodiments are given by way of example only, and various modifications may be made without departing from the spirit of the present disclosure. Appropriate modifications made without departing from the spirit of the present disclosure naturally fall within the technical scope of the present disclosure.

What is claimed is:

1. A detection device comprising
a sensor region and a detector disposed on a back surface of a front plate that is a nonconductor,
the sensor region having a detection region,
the detector being configured to detect an object to be detected on or above a surface of the front plate opposite to the sensor region and overlapping the detection region based on a detection value of each of a plurality of electrodes provided in the detection region, wherein
the detector comprises:
an initial setter configured to set a second distance equal to or larger than a first distance in a height direction of the front plate and register XY coordinates of an indicator in an XY plane where the object to be detected is detectable;
a storage configured to store therein a parameter generated by the initial setter; and
a gesture determination processor configured to determine a gesture corresponding to a change in spatial coordinates of the object to be detected based on the parameter stored in the storage.

2. The detection device according to claim 1, wherein the detector detects the object to be detected, when the gesture determination processor determines that the registered XY coordinates of the indicator match the spatial coordinates where the object to be detected is present on or above the surface of the front plate opposite to the sensor region and overlapping the detection region.

3. The detection device according to claim 1, wherein the detector detects that a predetermined gesture is performed, when the gesture determination processor determines that a registered XY coordinate locus of a gesture matches a coordinate locus of the spatial coordinates where the object to be detected is present on or above the surface of the front plate opposite to the sensor region and overlapping the detection region.

4. The detection device according to claim 3, wherein the front plate is made of any one of wood, plywood, natural fiber, natural stone, marble, artificial stone, synthetic fiber, and synthetic leather.

5. The detection device according to claim 1, wherein the first distance is 0.5 mm to 100 mm.

* * * * *